United States Patent
Fujita et al.

(10) Patent No.: US 9,757,816 B2
(45) Date of Patent: Sep. 12, 2017

(54) MACHINING DEVICE AND MACHINING METHOD

(71) Applicant: MITSUBISHI HEAVY INDUSTRIES, LTD., Tokyo (JP)

(72) Inventors: Yoshihito Fujita, Tokyo (JP); Tsugumaru Yamashita, Tokyo (JP); Saneyuki Goya, Tokyo (JP); Makoto Yamasaki, Tokyo (JP); Ryu Suzuki, Tokyo (JP); Kohei Kanaoka, Tokyo (JP); Takashi Ishide, Tokyo (JP); Toshiya Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 169 days.

(21) Appl. No.: 14/655,281

(22) PCT Filed: Nov. 22, 2013

(86) PCT No.: PCT/JP2013/081562
§ 371 (c)(1),
(2) Date: Jun. 24, 2015

(87) PCT Pub. No.: WO2014/132503
PCT Pub. Date: Sep. 4, 2014

(65) Prior Publication Data
US 2015/0352666 A1    Dec. 10, 2015

(30) Foreign Application Priority Data
Feb. 27, 2013   (JP) .................................. 2013-038006

(51) Int. Cl.
B23K 26/00    (2014.01)
B23K 26/03    (2006.01)
(Continued)

(52) U.S. Cl.
CPC ............ *B23K 26/032* (2013.01); *B23K 26/00* (2013.01); *B23K 26/046* (2013.01); *B23K 26/06* (2013.01);
(Continued)

(58) Field of Classification Search
CPC ............ B23K 2203/04; B23K 2203/05; B23K 2203/08; B23K 2203/14; B23K 2203/16;
(Continued)

(56) References Cited

U.S. PATENT DOCUMENTS 4,079,230 A    3/1978  Miyauchi et al.
4,324,972 A *  4/1982  Furrer ................... B23K 26/02
                                                   219/121.63
(Continued)

FOREIGN PATENT DOCUMENTS

CN    200967119 Y    10/2007
CN    101935156 A    1/2011
(Continued)

OTHER PUBLICATIONS

Chinese Notice of Allowance, issued Jun. 3, 2016, for Chinese Application No. 201380068091.6, along with an English translation.
(Continued)

*Primary Examiner* — Sang Y Paik
(74) *Attorney, Agent, or Firm* — Birch, Stewart, Kolasch & Birch, LLP

(57) ABSTRACT

Provided are a machining device and a machining method in which machining of higher precision can be performed with a simple configuration. The machining device has an irradiation head (16) and a controller; and the irradiation head (16) can be divided into a collimate optical system, a laser revolving unit (35), and a light collection optical system (37). The laser revolving unit (35) has a first prism (51), a
(Continued)

second prism (52), a first rotation mechanism (53), and a second rotation mechanism (54). The controller controls the rotational speeds and the difference in phase angles of the first prism (51) and the second prism (52), on the basis of at least the relationship between a heat affected layer of a member to be machined and the revolving speed of the laser.

21 Claims, 19 Drawing Sheets

(51) Int. Cl.
| | |
|---|---|
| *B23K 26/14* | (2014.01) |
| *B23K 26/046* | (2014.01) |
| *B23K 26/06* | (2014.01) |
| *B23K 26/34* | (2014.01) |
| *B23K 26/38* | (2014.01) |
| *B23K 26/382* | (2014.01) |
| *B23K 26/40* | (2014.01) |
| *B23K 26/402* | (2014.01) |
| *B23K 26/26* | (2014.01) |
| *B23K 103/04* | (2006.01) |
| *B23K 103/08* | (2006.01) |
| *B23K 103/14* | (2006.01) |
| *B23K 103/16* | (2006.01) |
| *B23K 103/00* | (2006.01) |
| *B23K 103/18* | (2006.01) |

(52) U.S. Cl.
CPC .......... *B23K 26/0652* (2013.01); *B23K 26/14* (2013.01); *B23K 26/26* (2013.01); *B23K 26/34* (2013.01); *B23K 26/38* (2013.01); *B23K 26/382* (2015.10); *B23K 26/40* (2013.01); *B23K 26/402* (2013.01); *B23K 2203/04* (2013.01); *B23K 2203/05* (2015.10); *B23K 2203/08* (2013.01); *B23K 2203/14* (2013.01); *B23K 2203/16* (2013.01); *B23K 2203/26* (2015.10); *B23K 2203/42* (2015.10); *B23K 2203/50* (2015.10); *B23K 2203/52* (2015.10)

(58) Field of Classification Search
CPC ............ B23K 2203/26; B23K 2203/42; B23K 2203/50; B23K 2203/52; B23K 26/00; B23K 26/032; B23K 26/046; B23K 26/06; B23K 26/0652; B23K 26/14; B23K 26/26; B23K 26/34; B23K 26/345; B23K 26/38; B23K 26/381; B23K 26/382; B23K 26/40; B23K 26/401; B23K 26/402; B23K 26/4065; B23K 26/408
USPC ......................................... 219/121.6–121.86
See application file for complete search history.

(56) References Cited

U.S. PATENT DOCUMENTS

| | | | |
|---|---|---|---|
| 5,223,692 A | 6/1993 | Lozier et al. | |
| 5,632,083 A * | 5/1997 | Tada .................... | B23K 26/032 219/121.68 |
| 6,444,948 B1 * | 9/2002 | Giering .................. | B23K 26/06 219/121.73 |
| 8,395,084 B2 * | 3/2013 | Tanaka ............... | B23K 26/0738 219/121.6 |
| 2002/0104831 A1 | 8/2002 | Chang et al. | |
| 2006/0255019 A1 * | 11/2006 | Martukanitz ...... | B23K 26/0648 219/121.64 |
| 2012/0188365 A1 * | 7/2012 | Stork .................... | B23K 26/046 348/90 |
| 2013/0126492 A1 * | 5/2013 | Mori ...................... | B23K 26/00 219/121.83 |
| 2015/0014889 A1 | 1/2015 | Goya et al. | |

FOREIGN PATENT DOCUMENTS

| | | |
|---|---|---|
| CN | 101961817 A | 2/2011 |
| CN | 102189340 A | 9/2011 |
| CN | 102626830 A | 8/2012 |
| JP | 58-6786 A | 1/1983 |
| JP | 59-19798 B2 | 5/1984 |
| JP | 5-183216 A | 7/1993 |
| JP | 6-155065 A | 6/1994 |
| JP | 2828871 B2 | 11/1998 |
| JP | 2831215 B2 | 12/1998 |
| JP | 11-156579 A | 6/1999 |
| JP | 2001-138076 A | 5/2001 |
| JP | 2005-342749 A | 12/2005 |
| JP | 2006-82130 A | 3/2006 |
| JP | 2008-119716 A | 5/2008 |
| JP | 2009-50869 A | 3/2009 |
| JP | 2011-11212 A | 1/2011 |
| JP | 2011-25279 A | 2/2011 |
| JP | 2011-67873 A | 4/2011 |
| JP | 2011-110598 A | 6/2011 |
| JP | 2012-17231 A | 1/2012 |
| JP | 5189684 B1 | 4/2013 |

OTHER PUBLICATIONS

Korean Office Action, issued Jul. 8, 2016, for Korean Application No. 10-2015-7016906, along with an English translation.
Taiwanese Notice of Allowance, issued May 26, 2016, for Taiwanese Application No. 102143593, along with a partial English translation.
Office Action issued in corresponding Chinese Application No. 201380068091.6 dated Jan. 4, 2016 with an English Translation.
Taiwanese Office Action and Search Report dated Oct. 1, 2015, for Taiwanese Application No. 102143593 with the English translation.
Decision of a Patent Grant, issued in JP 2013-038006, dated Aug. 6, 2013.
International Search Report, issued in PCT/JP2013/081562, dated Feb. 25, 2014.
Written Opinion of the International Searching Authority, issued in PCT/JP2013/081562, dated Feb. 25, 2014.
Extended European Search Report dated Jan. 4, 2016 issued in corresponding European Application No. 13876594.6.
Decision of Patent Grant mailed Jan. 26, 2017 in the corresponding Korean Patent Application No. 10-2015-7016906 with a machine English Translation.

\* cited by examiner

<SURFACE>

<INSIDE>

MACHINING DEVICE AND MACHINING METHOD

TECHNICAL FIELD

The present invention relates to a machining device and a machining method that machine a workpiece by irradiating the workpiece with a laser beam.

BACKGROUND ART

There is a machining device that cuts or pierces a hole in a workpiece using a laser beam (for example, refer to PTL 1 and PTL 2). The machining device disclosed in PTL 1 and PTL 2 cuts or pierces a hole in a workpiece by irradiating the workpiece with a laser beam. A laser beam machining method disclosed in PTL 1 is a method of piercing a hole in a workpiece by irradiating the workpiece with at least two types of wavelength of laser beam, and which includes a step of machining the workpiece by irradiating the workpiece with a first laser beam having a spot diameter smaller than a hole diameter along an inner circumference of a hole, and a step of irradiating a portion inside of the inner circumference of the hole with a second laser beam having a spot diameter smaller than the hole diameter and a wavelength longer than that of the first laser beam, and a part, which remains without being machined in the former step, is machined in the latter step. PTL 1 discloses a device that is configured to offset the irradiation position of the first laser beam via a combination of galvanometer mirrors. PTL 2 discloses a device that is configured to have a coil provided in a structure holding a lens, and a permanent magnet provided in a base, and to rotate the focal point of a laser beam by rotating the lens via the driving of the coil.

PTL 3 filed by the applicant discloses a machining device that includes a $CO_2$ laser beam oscillator and an excimer laser beam oscillator, uses a $CO_2$ laser beam and an excimer laser beam as two laser beams, and cuts or pierces a hole in a plastic member or an FRP member by irradiating the plastic member or the FRP member with the $CO_2$ laser beam, and subsequently, removes a carbonized layer or a heat-affected layer occurring on a cut surface by irradiating the cut surface and the vicinity of the cut surface with the excimer laser beam. In the machining device disclosed in PTL 3, an excimer laser beam having a ring-shaped cross section is generated, the $CO_2$ laser beam is coaxially inserted into a hollow portion of the excimer laser beam, and both the laser beams are transmitted on the same transmission path, are guided to the vicinity of a cutting portion or a pierced hole portion of a plastic member or an FRP member, and both the laser beams are re-separated from each other in the vicinity of the cutting portion or the pierced hole portion.

CITATION LIST

Patent Literature

[PTL 1] Japanese Unexamined Patent Application Publication No. 2011-110598
[PTL 2] Japanese Patent No. 2828871
[PTL 3] Japanese Patent No. 2831215

SUMMARY OF INVENTION

Technical Problem

The machining device disclosed in PTL 1 and PTL 2 can appropriately machine a workpiece by rotating the irradiation position of a laser beam. The machining device disclosed in PTL 3 can appropriately machine a workpiece using two laser beams. However, there is a problem in that the machining device disclosed in PTLs 1 to 3 requires a complicated device configuration so as to improve machining precision.

The present invention is made in light of this problem, and an object of the present invention is to provide a machining device with a simple configuration and a machining method that can perform high-precision machining.

Solution to Problem

According to an aspect of the present invention to solve the aforementioned problem and achieve the object, there is provided a machining device that performs a machining process by irradiating a workpiece with a laser beam, the device including: an irradiating head configured to irradiate the workpiece with the laser beam, and having a collimating optical system that collimates the laser beam, a laser beam rotating unit that rotates the laser beam relative to the workpiece, and a converging optical system that converges the laser beam rotated by the laser beam rotating unit to a focal point; and a controller configured to control the operation of the irradiating head. The irradiating head is divided into the collimating optical system, the laser beam rotating unit, and the converging optical system. The laser beam rotating unit has a first prism that refracts the laser beam, a second prism that is disposed to face the first prism and refracts the laser beam output from the first prism, a first rotation mechanism that rotates the first prism, and a second rotation mechanism that rotates the second prism. The controller is configured to adjust a difference in a rotational speed between the first prism and the second prism and a difference in a phase angle between the first prism and the second prism by controlling the first rotation mechanism and the second rotation mechanism synchronously and relatively in rotation based on a relationship between at least a predetermined thickness allowable to be affected by heat of a heat-affected layer of the workpiece and the rotating speed of the laser beam with which the workpiece is irradiated such that a thickness of the heat affected layer is smaller than the predetermined thickness.

In the machining device according to the aspect, the irradiating head is preferably configured such that the collimating optical system, the laser beam rotating unit, and the converging optical system are integrally connected to each other.

In the machining device according to the aspect, the irradiating head preferably has a reflective optical system configured to offset the optical path of the laser beam in the converging optical system relative to the optical path of the laser beam in the laser beam rotating unit, and an index mechanism configured to adjust the angle of the optical path of the laser beam from the reflective optical system to an index angle for the workpiece.

In the machining device according to the aspect, the index mechanism preferably has an index shaft connected to the reflective optical system, and a hollow shaft motor configured to drive the rotation of the index shaft which is rotatably inserted into the hollow shaft motor.

In the machining device according to the aspect, the irradiating head preferably has a gap detector for detecting the gap between the focal point of the laser beam and the workpiece.

In the machining device according to the aspect, the gap detector preferably has an imaging device for capturing an image of a machined portion of the workpiece.

In the machining device according to the aspect, the irradiating head preferably has a cooling mechanism configured to cool the laser beam rotating unit.

In the machining device according to the aspect, each of the first prism and the second prism preferably has a polygonal outline.

In the machining device according to the aspect, preferably, an incident surface of the first prism is tilted relative to the optical axis of the laser beam, and an emitting surface of the second prism is tilted relative to the optical axis of the laser beam.

In the machining device according to the aspect, the irradiating head preferably has an assist gas supply piping therein.

In the machining device according to the aspect, the irradiating head preferably has a tail-end cutting optical system that cuts the tail-ends of the energy distribution of the laser beam with which the workpiece is irradiated.

In the machining device according to the aspect, the machining process preferably includes at least one of cutting, hole piercing, welding, cladding, surface reforming, surface finishing, and laser beam deposition modeling.

In the machining device according to the aspect, the heat-affected layer preferably includes at least one of a re-melted layer, an oxidized layer, cracks, and dross.

In the machining device according to the aspect, the workpiece is preferably made of any one material from Inconel (trademark), Hastelloy (trademark), stainless steel, ceramics, steel, carbon steel, heat-resistant steel, silicon, titanium, tungsten, resin, plastics, fiber reinforced plastics, composite materials, and Ni-based heat-resistant alloy.

In the machining device according to the aspect, the controller preferably adjusts the difference in the rotational speed between the first prism and the second prism and the difference in the phase angle between the first prism and the second prism by controlling the first rotation mechanism and the second rotation mechanism based on a relationship between at least the predetermined thickness allowable to be affected by heat of the heat-affected layer of the workpiece, the rotating speed of the laser beam with which the workpiece is irradiated, and the rotating radius of the laser beam.

According to another aspect of the present invention to solve the aforementioned problem and achieve the object, there is provided a machining method for performing a machining process by irradiating a workpiece with a laser beam using the machining device according to any one of claims 1 to 15, the method including: an output step of outputting the laser beam; a determination step of determining the difference in the rotational speed between the first prism and the second prism the difference in the phase angle between the first prism and the second prism based on the relationship between at least the predetermined thickness allowable to be affected by heat of the heat-affected layer of the workpiece, and the rotating speed of the laser beam with which the workpiece is irradiated such that the thickness of the heat affected layer is smaller than the predetermined thickness; a rotation step of rotating the first rotation mechanism and the second rotation mechanism synchronously and relatively in rotation based on the determined difference in the rotational speed and the determined difference in the phase angle; and an irradiation step of irradiating the workpiece with the laser beam while rotating the laser beam.

In the machining method according to the aspect, a power of the laser beam is preferably modulated at every rotation of the laser beam relative to the workpiece.

In the machining method according to the aspect, the workpiece is preferably machined in multiple stages.

In the machining method according to the aspect, a non-truly circularly shaped hole is preferably pierced in the workpiece.

In the machining method according to the aspect, preferably, the roundness of a hole is detected, a phase angle difference between the first prism and the second prism so as to make the irradiation laser beam form a true circular shape corresponding to the detected roundness is calculated, the first prism and the second prism are controlled based on the calculated phase angle difference, and thus the roundness of the hole pierced in the workpiece is corrected.

In the machining method according to the aspect, preferably, the gap between the focal point of the laser beam and the workpiece is detected, a relative position between the focal point and the workpiece required to pierce a tapered hole or a straight hole is calculated based on the detected gap, the relative position between the focal point and the workpiece is adjusted to the calculated relative position, the workpiece is irradiated with the laser beam, and thus the tapered or the straight hole is pierced in the workpiece.

In the machining method according to the aspect, preferably, the boundary between different materials of the workpiece is irradiated with a non-circularly-shaped laser beam, and thus an inclined hole is pierced in the workpiece.

In the machining device according to the aspect, preferably, in the determination step, the difference in the rotational speed of the first prism and the second prism and the difference in the phase angle between the first prism and the second prism are determined based on a the relationship between at least the predetermined thickness allowable to be affected by heat of the heat-affected layer of the workpiece, the rotating speed of the laser beam with which the workpiece is irradiated, and the rotating radius of the laser beam.

Advantageous Effects of Invention

According to the machining device and the machining method of the present invention, the irradiating head can be divided into the collimating optical system, the laser beam rotating unit, and the converging optical system, and thus it is possible to reduce the size of the irradiating head, and to further reduce the size of the machining device. It is possible to change the rotating radius of the laser beam, with which the workpiece is irradiated, by changing only the phase angle difference between the first prism and the second prism, and thus the machining device can be configured to be simple. It is possible to change the rotating radius of the laser beam, in which the workpiece is irradiated with the laser beam, by controlling the phase angle difference between the first prism and the second prism, and thus it is possible to perform a machining process using a rotating radius appropriate for machining conditions. Accordingly, required machining quality can be satisfied, and machining with higher precision can be performed at a high speed.

DESCRIPTION OF EMBODIMENTS

Embodiments of the present invention will be described in detail with reference to the accompanying drawings. The present invention is not limited by the content of the embodiments. Configurational elements described hereinbelow include those that can be easily conceived by persons skilled in the art, and substantially the same ones conceived by persons skilled in the art. The following configurational elements can be appropriately combined together. Various omissions, replacements, or changes can be made to the configuration of the present invention in a scope without departing from the spirit of the present invention.

First Embodiment

Figure 1:
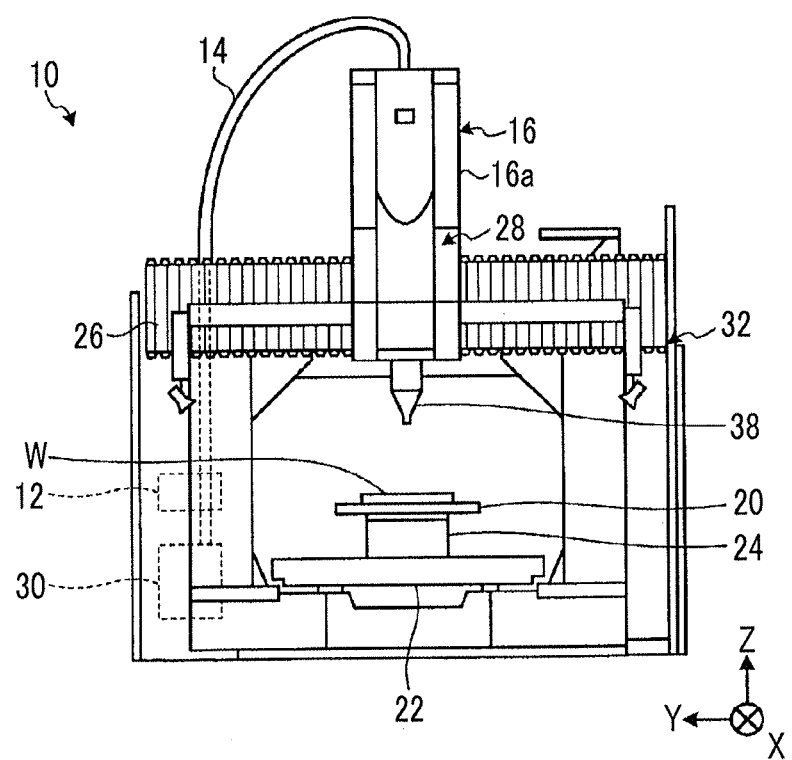
FIG. 1 is a schematic view illustrating an example of the configuration of a machining device according to a first embodiment.

FIG. 1 is a schematic view illustrating an example of the configuration of a machining device according to a first embodiment.

As illustrated in FIG. 1, a machining device 10 includes a laser beam oscillator 12; a guiding optical system 14; an irradiating head 16; a machining stage 20; an X-axis movement mechanism 22; a C-axis rotation mechanism 24; a Y-axis movement mechanism 26; a Z-axis movement mechanism 28; and a controller 30. The machining device 10 has a portal bridge 32 surrounding the machining stage 20. The machining device 10 machines a workpiece W by irradiating the workpiece W with a laser beam, in which the workpiece W is held on the machining stage 20. In the embodiment, a horizontal surface of the machining stage 20 is referred to as an X-Y plane, and a direction perpendicular to the horizontal surface of the machining stage 20 is referred to as a Z-axis direction. In the embodiment, a rotational direction around a Z-axis is referred to as a C-axis direction.

Herein, for example, the workpiece W is a plate-like member. A member made of the following various materials can be used as the workpiece W: Inconel (trademark); Hastelloy (trademark); stainless steel; ceramics; steel; carbon steel; heat-resistant steel; silicon; titanium; tungsten; resin; plastics; Ni-based heat-resistant alloy; and the like. A member made of the following various materials can be used as the workpiece W: fiber reinforced plastics such as carbon fiber reinforced plastics (CFRP), glass fiber reinforced plastics (GFRP), and glass-mat reinforced thermoplastics (GMT); metals such as ferroalloys other than sheet steel and aluminum alloys; composite materials; and the like. In the embodiment, a machining process may be any one or a combination of cutting, hole piercing, welding, cladding, surface reforming, surface finishing, and laser beam-assisted deposition modeling.

The laser beam oscillator 12 is a device that is configured to output a laser beam, and is provided in the portal bridge 32 of the machining device 10. The following laser beam output devices are used as the laser beam oscillator 12: a fiber laser beam output device that is configured to output a laser beam via an optical fiber as a medium; a short pulsed laser beam output device that is configured to output a short pulsed laser beam, or the like. A Fabry-Perot type fiber laser beam output device, a ring type fiber laser beam output device, or the like can be used as the fiber laser beam output device, and this output device is excited to oscillate a laser beam. A fiber of the fiber laser beam output device can be made of silica glass to which a rare earth element, for example, erbium (Er), neodymium (Nd), or ytterbium (Yb), is added. For example, the short pulsed laser beam output device can use a titanium sapphire laser beam as a laser beam oscillation source, and can oscillate a pulsed laser beam of a pulse width of 100 picoseconds or less. It is possible to use a laser beam oscillation source which oscillates a YAG laser beam, a YVO4 laser beam, or the like of a nanosecond-order pulse.

The guiding optical system 14 is an optical system that is configured to guide a laser beam from the laser beam oscillator 12 to the irradiating head 16. In the embodiment, for example, the guiding optical system 14 is an optical fiber. One end portion of the guiding optical system 14 is connected to a laser beam emitting port of the laser beam oscillator 12, and the other end portion is connected to a laser beam incident end of the irradiating head 16. The guiding optical system 14 guides a laser beam from the light emitting port of the laser beam oscillator 12 to the incident end of the irradiating head 16.

The irradiating head 16 irradiates the workpiece W with the laser beam while rotating the laser beam guided by the guiding optical system 14. The irradiating head 16 refracts the laser beam using a prism, and thus, the optical path of the laser beam, with which the workpiece W is irradiated, is offset relative to the optical path of the laser beam before being reflected. The irradiating head 16 converges the laser beam to a focal point, and irradiates the workpiece W with the focused laser beam. The irradiating head 16 is covered with an irradiating head cover 16a. The structure of the irradiating head 16 will be described later.

The machining stage 20 is a mechanism that is configured to hold the workpiece W mounted thereon. The surface of the machining stage 20 is a plane (the X-Y plane) horizontal to a reference plane (for example, the mounting surface on which the machining device 10 is mounted), and holds the workpiece W.

The X-axis movement mechanism 22 is an X-axis stage that is configured to support the machining stage 20, and moves the workpiece W to a predetermined position in an X-axis direction by moving the machining stage 20 in the X-axis direction.

The C-axis rotation mechanism 24 is disposed between the X-axis movement mechanism 22 and the machining stage 20. That is, the C-axis rotation mechanism 24 is supported by the X-axis movement mechanism 22, and supports the machining stage 20. The C-axis rotation mechanism 24 rotates the workpiece W to a predetermined position in the C-axis direction by rotating the machining stage 20 in the C-axis direction.

The Y-axis movement mechanism 26 supports the Z-axis movement mechanism 28, and moves the irradiating head 16 in a Y-axis direction. Accordingly, the Y-axis movement mechanism 26 moves the irradiating head 16 to a predetermined position in the Y-axis direction.

The Z-axis movement mechanism 28 supports the irradiating head 16, and moves the irradiating head 16 to a predetermined position in the Z-axis direction.

The machining device 10 moves the irradiating head relative to the machining stage 20 in four axial directions, that is, in the X-axis, Y-axis, Z-axis, and C-axis directions, using the X-axis movement mechanism 22, the C-axis rotation mechanism 24, the Y-axis movement mechanism 26, and the Z-axis movement mechanism 28, and thus moves a relative positional relationship between the workpiece W and the laser beam in the four axial directions.

The controller 30 is connected to each of the laser beam oscillator 12, the irradiating head 16, the X-axis movement mechanism 22, the C-axis rotation mechanism 24, the Y-axis movement mechanism 26, and the Z-axis movement mechanism 28, and controls the operation of each of these units. For example, the controller 30 adjusts various conditions for a laser beam output from the laser beam oscillator 12, adjusts the position of the irradiating head 16 relative to the workpiece W by moving the irradiating head 16 and the machining stage 20 using the X-axis movement mechanism 22, the C-axis rotation mechanism 24, the Y-axis movement mechanism 26, and the Z-axis movement mechanism 28, detects and sets the predetermined thickness allowable to be affected by heat (hereinafter called the allowable thickness) of a heat-affected layer based on conditions (material, thickness, and the like) of the workpiece W or machining process conditions, or controls a rotating speed and a rotating radius R (both to be described later) of a laser beam with which the irradiating head 16 irradiates the workpiece W.

Figure 2:
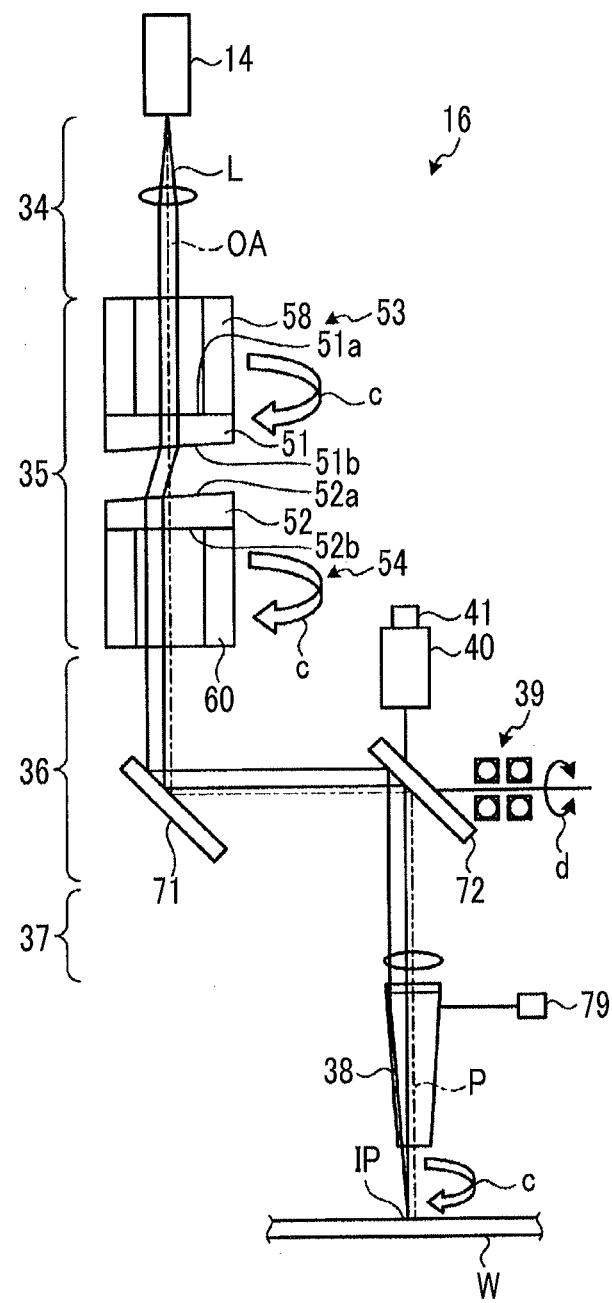
FIG. 2 is a schematic view illustrating the configuration of the irradiating head according to the first embodiment.
Figure 3:
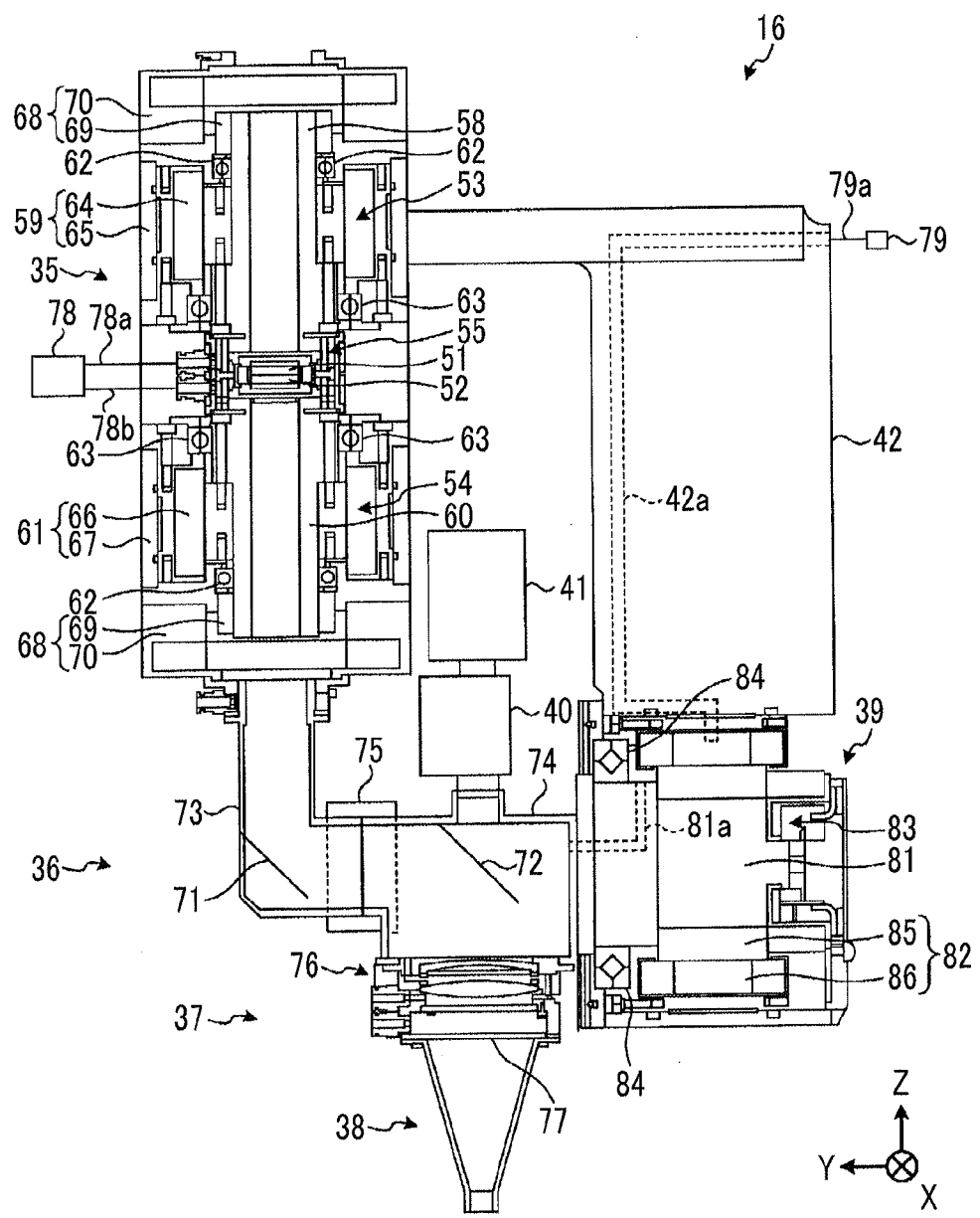
FIG. 3 is an enlarged schematic view illustrating an enlarged portion from a laser beam rotating unit to a nozzle of the irradiating head according to the first embodiment.
Figure 4:
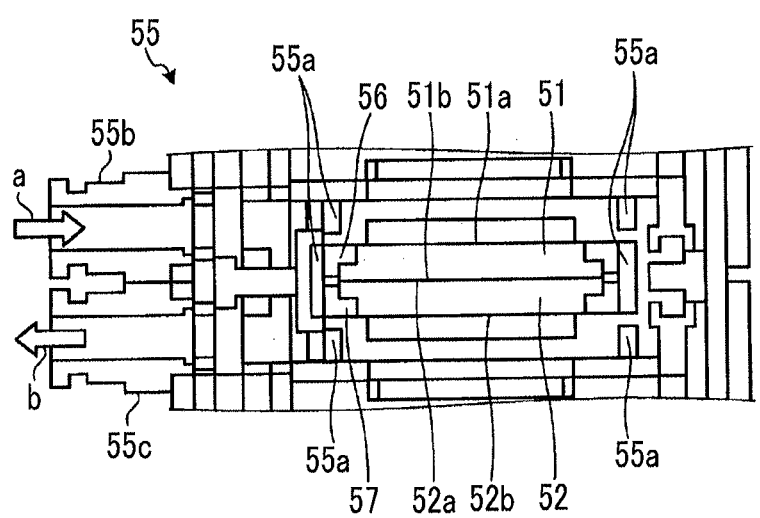
FIG. 4 is a schematic view illustrating an example of the configuration of a cooling jacket.
Figure 5:
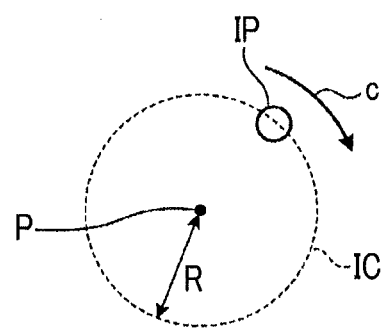
FIG. 5 is a view illustrating the irradiation position of a laser beam with which the workpiece is irradiated.

Subsequently, the irradiating head 16 is described with reference to FIGS. 2 to 5. FIG. 2 is a schematic view illustrating the configuration of the irradiating head according to the first embodiment. FIG. 3 is an enlarged schematic view illustrating an enlarged portion from a laser beam rotating unit to a nozzle of the irradiating head according to the first embodiment. FIG. 4 is a schematic view illustrating an example of the configuration of a cooling jacket. FIG. 5 is a view illustrating the irradiation position of a laser beam with which the workpiece is irradiated.

As illustrated in FIGS. 2 and 3, the irradiating head 16 includes a collimating optical system 34; a laser beam rotating unit 35; a reflective optical system 36; a converging optical system 37; a nozzle 38; an index mechanism 39; an imaging device 40; a gap detector 41; and a support part 42. In the irradiating head 16, the collimating optical system 34, the laser beam rotating unit 35, the reflective optical system 36, the converging optical system 37, and the nozzle 38 are disposed in the sequence as listed from an upstream side to a downstream side of the optical path of the laser beam L output from the guiding optical system 14. The irradiating head 16 can be divided into the collimating optical system 34, the laser beam rotating unit 35, the reflective optical system 36, and the converging optical system 37. The irradiating head 16 irradiates the workpiece W with the laser beam L output from the guiding optical system 14, in which the workpiece W faces the nozzle 38.

The collimating optical system 34 is disposed to face an end surface of the guiding optical system 14, in which the laser beam L is emitted via the end surface. That is, the collimating optical system 34 is disposed between the guiding optical system 14 and the laser beam rotating unit 35. The collimating optical system 34 includes a collimator lens or the like, converts the laser beam L from the guiding optical system 14 into collimated light, and emits the collimated light toward the laser beam rotating unit 35.

As illustrated in FIGS. 2 and 5, the laser beam rotating unit 35 irradiates the workpiece W with the laser beam L while rotating the laser beam L around a center P of the optical path, that is, rotates an irradiation position IP of the laser beam L. As illustrated in FIG. 3, the laser beam rotating unit 35 has a first prism 51; a second prism 52; a first rotation mechanism 53; a second rotation mechanism 54; and a cooling mechanism 55.

The first prism 51 tilts the laser beam L relative to an optical axis OA by refracting the laser beam L. The second prism 52 controls the concentration position of the laser beam L by re-refracting the laser beam L refracted by the first prism 51. Accordingly, the laser beam L passing through the laser beam rotating unit 35 is output on an optical path that is offset relative to the optical path of the laser beam L before passing through the laser beam rotating unit 35.

As illustrated in FIGS. 2 and 4, the first prism 51 has an incident surface 51a onto which the laser beam L is incident, and an emitting surface 51b through which the laser beam L is emitted. For example, the first prism 51 has an octagonal outline. The first prism 51 is fixed to a prism holder 56. For example, the prism holder 56 has a holding hole that has an octagonal shape corresponding to the outline of the first prism 51, and holds the first prism 51 via the holding hole.

The incident surface 51a is a flat surface that is slightly tilted relative to the optical axis OA. The tilt angle of the incident surface 51a relative to the optical axis OA is less than 1°. That is, when the laser beam L from the guiding optical system 14 is incident onto the incident surface 51a, the laser beam L is refracted by the incident surface 51a so that the laser beam L can be offset from the optical axis OA. Accordingly, the first prism 51 can reduce the amount of reflection of the laser beam L from the incident surface 51a toward the guiding optical system 14, and the amount of laser beam which is reflected toward the emitting port of the laser beam oscillator 12.

The emitting surface 51b is a flat surface that is tilted so as to refract the emitted laser beam L. Accordingly, the first prism 51 tilts the laser beam L relative to the optical axis OA by refracting the laser beam L output from the guiding optical system 14.

The second prism 52 has an incident surface 52a onto which the laser beam L is incident, and an emitting surface 52b through which the laser beam L is emitted. For example, the second prism 52 has an octagonal outline. The second prism 52 is fixed to a prism holder 57. For example, the prism holder 57 has a holding hole that has an octagonal shape corresponding to the outline of the second prism 52, and holds the second prism 52 via the holding hole.

The incident surface 52a is a flat surface that is tilted so as to refract the laser beam L output from the first prism 51. Accordingly, the second prism 52 controls the concentration position of the laser beam L by re-refracting the laser beam L refracted by the first prism 51. That is, the second prism 52 outputs the laser beam L while offsetting the optical path of the laser beam L passing through the laser beam rotating unit 35 relative to the optical path of the laser beam L before passing through the laser beam rotating unit 35.

The emitting surface 52b is a flat surface that is slightly tilted relative to the optical axis of the laser beam L refracted by the incident surface 52a. The tilt angle of the emitting surface 52b relative to the optical axis of the laser beam L refracted by the incident surface 52a is less than 1°. That is, when the laser beam L from the first prism 51 is emitted via the emitting surface 52b, the laser beam L refracted by the emitting surface 52b can be offset from the optical axis of the laser beam L refracted by the incident surface 52a. Accordingly, the second prism 52 can reduce the amount of the laser beam L which is reflected from the emitting surface 52b toward the guiding optical system 14, and the amount of the laser beam L which is reflected toward the emitting port of the laser beam oscillator 12.

As illustrated in FIG. 3, the first rotation mechanism 53 has a first spindle 58 and a first hollow shaft motor 59, in which the first spindle 58 is configured to hold the first prism 51, and the first hollow shaft motor 59 is configured to rotate the first spindle 58 inserted into the first hollow shaft motor 59. The second rotation mechanism 54 has a second spindle 60 and a second hollow shaft motor 61, in which the second spindle 60 is configured to hold the second prism 52, and the second hollow shaft motor 61 is configured to rotate the second spindle 60 inserted into the second hollow shaft motor 61. The first rotation mechanism 53 and the second rotation mechanism 54 can rotate synchronously with each other, which is a relative rotation therebetween.

Each of the first spindle 58 and the second spindle is a cylindrical member having a hollow portion that works as the optical path of the laser beam L. The prism holder 56 is fixed to a leading edge of the first spindle 58 in a travel direction of the laser beam L. The prism holder 57 is fixed to a trailing edge of the second spindle 60 in the travel direction of the laser beam L. Each of the first spindle 58 and the second spindle 60 is supported by bearings 62 and 63. The bearings 62 and 63 are rolling bearings such as rolling ball bearings.

The first hollow shaft motor 59 has a hollow rotor 64 fixed to an outer circumferential surface of the first spindle 58, and a stator 65 disposed to face the hollow rotor 64. The first hollow shaft motor 59 rotates the first prism 51 along with the first spindle 58. The second hollow shaft motor 61 has a hollow rotor 66 fixed to an outer circumferential surface of the second spindle 60, and a stator 67 disposed to face the hollow rotor 66. The second hollow shaft motor 61 rotates the second prism 52 along with the second spindle 60. The first prism 51 and the second prism 52 can rotate synchronously with each other, which is a relative rotation therebetween.

Each of the first rotation mechanism 53 and the second rotation mechanism 54 includes an encoder 68 that is configured to detect a relative position between a rotating portion (the first spindle 58 and the hollow rotor 64) and a fixed portion (the stator 65) and a rotating portion (the second spindle 60 and the hollow rotor 66) and a fixed portion (the stator 67), and to detect the rotational speed of the rotating portion. The encoder 68 has a phase mark 69 fixed to the rotation portion, and a detection unit 70 that is fixed to the fixed portion and is configured to detect the phase mark 69. The encoder 68 can detect the relative position of the rotating portion by detecting the phase mark 69 using the detection unit 70. The encoder 68 outputs information regarding the detected rotational speed and rotational position (phase angle) of the rotating portion to the controller 30. The encoder 68 is preferably configured as detection equipment that detects the rotational position (phase angle) at a resolution of one several thousandths of one degree (a resolution of 0.001 degrees or less).

The first rotation mechanism 53 and the second rotation mechanism 54 can change a phase angle difference between the first prism 51 and the second prism 52. Accordingly, as illustrated in FIG. 5, it is possible to offset a laser beam irradiation point from the center P of a rotary axis in the optical path to the irradiation position IP that is separated from the center P by a distance corresponding to the phase angle difference between the first prism 51 and the second prism 52. When the first rotation mechanism 53 and the second rotation mechanism 54 rotate synchronously with each other at the same rotational frequency while maintaining the phase angle difference between the first prism 51 and the second prism 52, the laser beam irradiation point draws a circular track of the rotating radius R. It is possible to rotate the laser beam irradiation point while increasing and decreasing the rotating radius of the laser beam irradiation point, and to draw an arbitrary curved track by rotating the first prism 51 non-synchronously with the second prism 52 (at different rotational frequencies).

In the embodiment, the phase angle difference between the first hollow shaft motor 59 and the second hollow shaft motor 61 represents a relative offset angle defined by the respective rotational positions (phase angles) of the first hollow shaft motor 59 and the second hollow shaft motor 61. An error in the phase angle difference between the first hollow shaft motor 59 and the second hollow shaft motor 61 represents the error of a phase offset angle bound by the first hollow shaft motor 59 and the second hollow shaft motor 61.

As illustrated in FIGS. 2 and 5, the rotating radius R represents the distance from the center P of the optical path to the irradiation position IP of the laser beam L with which the workpiece W is irradiated, and the rotating radius R represents the rotating radius of the laser beam L, with which the workpiece W is irradiated, around the center P. The rotating radius R is variable, that is, it is possible to change the rotating radius R of the laser beam L, with which the workpiece W is irradiated, by changing the phase angle difference between the first prism 51 and the second prism 52. The rotating speed of the laser beam L, with which the workpiece W is irradiated, represents the number of complete rotations of the irradiation position IP per unit time around the center P.

As illustrated in FIGS. 3 and 4, the cooling mechanism 55 has a cooling jacket 55a. A coolant flow path of the cooling jacket 55a surrounds the prism holder 56 and the prism holder 57. A coolant is supplied to the cooling jacket 55a via a connection portion 55b connected to a coolant supply pipe 78a of a coolant supply source 78 (in the direction of arrow a), and is discharged from a connection portion 55c connected to a coolant discharge pipe 78b of the coolant supply source 78 (in the direction of arrow b). The cooling jacket 55a has a temperature sensor. Accordingly, the cooling jacket 55a adjusts the temperature or flow rate of the coolant supplied from the coolant supply source 78 based on a detected temperature signal that is output from the temperature sensor to the controller 30, and thus, maintains the temperature of the first prism 51 and the second prism 52 at a predetermined temperature.

As illustrated in FIGS. 2 and 3, the reflective optical system 36 has a first reflective mirror 71 that reflects the laser beam L passing through the laser beam rotating unit 35; a second reflective mirror 72 that re-reflects the laser beam L reflected by the first reflective mirror 71; a lens-barrel 73; and a nozzle mounting portion 74. The reflective optical system 36 reflects the laser beam L from the laser beam rotating unit 35 toward the converging optical system 37 using the first reflective mirror 71 and the second reflective mirror 72. That is, the reflective optical system 36 offsets the optical path of the laser beam L in the converging optical system 37 from the optical path of the laser beam L in the laser beam rotating unit 35. The second reflective mirror 72 is a half mirror, and the imaging device 40 can capture an image of a machined portion of the workpiece W via the second reflective mirror 72. The lens-barrel 73 is connected to the nozzle mounting portion 74 by a joint portion 75.

The converging optical system 37 has a plurality of lenses, and forms a laser beam L having a predetermined focal length and a predetermined focal depth by concentrating the laser beam L reflected by the second reflective mirror 72 to a focal point via the plurality of lenses. The converging optical system 37 irradiates the workpiece W with the laser beam L having a predetermined spot diameter. The converging optical system 37 has a cooling mechanism 76. For example, the cooling mechanism 76 is a cooling jacket or the like that is configured to cool the plurality of lenses.

The nozzle 38 has a hollow conical shape, the diameter of which decreases gradually toward a leading edge in the travel direction of the laser beam L. The nozzle 38 is mounted on the nozzle mounting portion 74 via the converging optical system 37. The nozzle 38 has a transparent component 77 that is configured to prevent the converging optical system 37 from being contaminated with debris or the like which occur at a machining point of the workpiece W. An assist gas is supplied to the nozzle 38 from an assist gas supply source 79, and the nozzle 38 can eject the supplied assist gas toward the workpiece W.

In the embodiment, one or a mixture of the following gases can be used as the assist gas: air; nitrogen; oxygen; argon; xenon; helium; and the like. When oxygen is used as the assist gas so that the oxidation reaction heat from the oxygen can be used in a machining process, it is possible to further increase the speed of machining the workpiece W made of metal or the like. When nitrogen or argon is used as the assist gas so that the occurrence of an oxide film as a heat-affected layer can be prevented, it is possible to further improve machining precision for the workpiece W made of metal or the like. It is possible to change the types and mixing ratio of the assist gases, and the amount (pressure) of the assist gas discharged from the nozzle 38 depending on machining conditions such as the type, machining mode, and the like of the workpiece W.

The index mechanism 39 has an index shaft 81; a hollow shaft motor 82; and an index angle detector 83. The index shaft 81 is connected to the nozzle mounting portion 74, and rotates integrally with the nozzle mounting portion 74. An assist gas supply piping (internal pipe) 81a is formed in the index shaft 81, and the assist gas is supplied to the nozzle mounting portion 74 via the assist gas supply piping 81a. The index shaft 81 is supported by a bearing 84 so as to be able to rotate around a Y axis. For example, the bearing 84 is a hydrostatic bearing (fluid bearing). The hollow shaft motor 82 has a hollow rotor 85 fixed to an outer circumferential surface of the index shaft 81, and a stator 86 disposed to face the hollow rotor 85.

The hollow shaft motor 82 has the index shaft 81 as the center of rotation, and drives the nozzle 38 mounted on the nozzle mounting portion 74 so that the nozzle 38 can swing around the index shaft 81 (in the direction of arrow d). That is, the hollow shaft motor 82 drives the nozzle 38 so that the nozzle 38 can swing around the Y axis. The index mechanism 39 rotates the nozzle mounting portion 74 of the reflective optical system 36 around the index shaft 81 as the center of rotation, and can rotate the second reflective mirror 72 disposed coaxially with the index shaft 81 corresponding to the rotation of the nozzle mounting portion 74. Accordingly, even if an index angle is changed, it is possible to irradiate the workpiece W with the laser beam L, which is reflected by the second reflective mirror 72, via the nozzle 38. Since the index mechanism 39 causes the nozzle mounting portion 74 and the nozzle 38 to integrally swing, it is possible to prevent an increase in the size of a swinging portion.

The index angle detector 83 includes an encoder that is configured to detect a relative position (index angle) between a rotating portion (the index shaft 81 and the hollow rotor 85) and a fixed portion (the stator 86). The encoder outputs information regarding the detected index angle of the rotating portion to the controller 30. As such, since the index mechanism 39 is adopted, the machining device 10 moves the irradiating head 16 relative to the machining stage 20 in five axial directions, that is, in the X-axis, Y-axis, Z-axis, C-axis, and swing directions, using the X-axis movement mechanism 22, the C-axis rotation mechanism 24, the Y-axis movement mechanism 26, the Z-axis movement mechanism 28, and the index mechanism 39, and thus moves a relative position between the workpiece W and the irradiation laser beam L in the five axial directions.

The imaging device 40 is a camera having a charge coupled device (CCD), an image sensor, or the like. The imaging device 40 captures an image of the irradiation position IP, rotating radius R, or the like of the laser beam L, generates image data from the captured image, and outputs the image data to the controller 30. The imaging device 40 is mounted on the nozzle mounting portion 74 at a position at which the imaging device 40 faces the nozzle 38 with the nozzle mounting portion 74 interposed between the imaging device 40 and the nozzle 38. The imaging device 40 is disposed coaxially with the center P of the optical path.

The gap detector 41 is a gap measurement device that is configured to measure a gap using a laser beam. The gap detector 41 detects the gap between the workpiece W and the focal point of the laser beam L with which the workpiece W is irradiated. The gap detector 41 outputs the detected gap to the controller 30. The gap detector 41 is connected to the imaging device 40, and is disposed coaxially with the center P of the optical path.

The support part 42 is supported by the Y-axis movement mechanism 26. The support part 42 supports the laser beam rotating unit 35 and the index mechanism 39. An assist gas supply piping (internal pipe) 42a is formed in the support part 42, and the assist gas is supplied to the nozzle mounting portion 74 via the assist gas supply piping 42a. Accordingly, the assist gas is sent from the assist gas supply source 79 to the assist gas supply piping 42a of the support part 42 via a gas piping 79a, and then is sent to the internal space of the hollow shaft motor 82 of the index mechanism 39 via the assist gas supply piping 42a, and then is sent from the internal space to the assist gas supply piping 81a of the index shaft 81, and then is sent from the assist gas supply piping 81a to the inside of the nozzle mounting portion 74, and then is sent from the inside of the nozzle mounting portion 74 to the nozzle 38 via the converging optical system 37, and is ejected toward the workpiece W via the nozzle 38.

Figure 6:
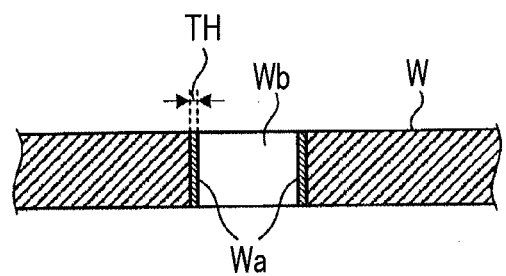
FIG. 6 is a sectional view of the workpiece in which a hole is pierced.
Figure 7:
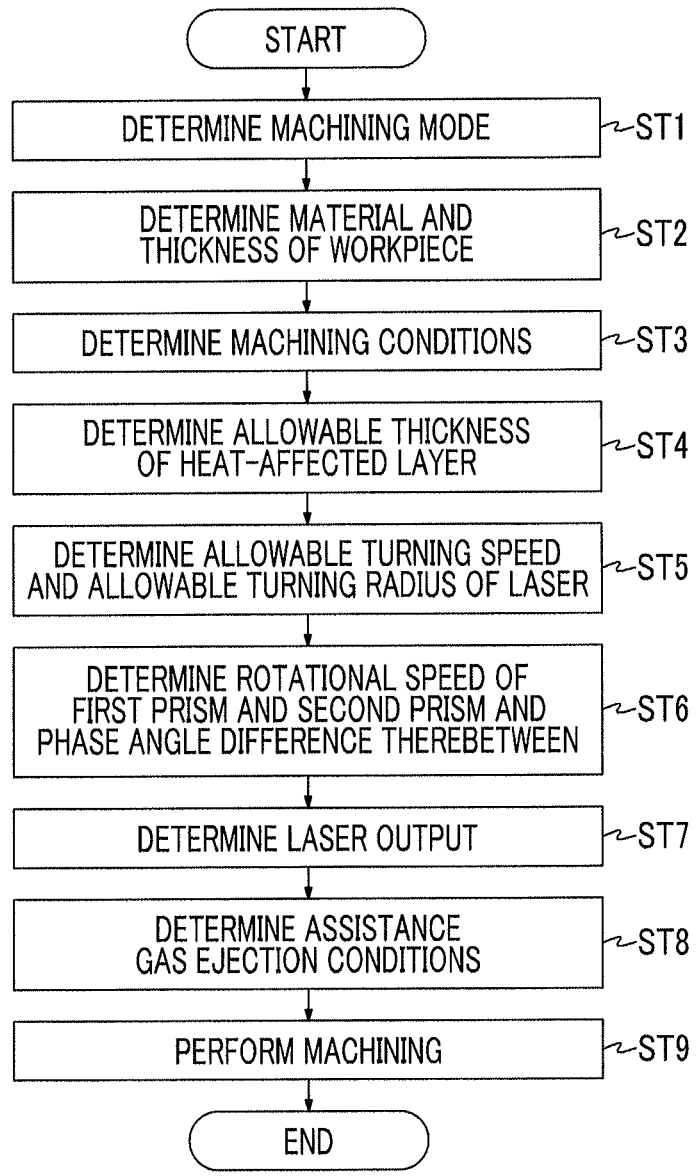
FIG. 7 is a flowchart illustrating an example of a control operation performed by the machining device.

Subsequently, a machining process performed by the machining device 10 is described with reference to FIGS. 5 to 7. FIG. 5 is a view illustrating the irradiation position of the laser beam with which the workpiece is irradiated. FIG. 6 is a sectional view of the workpiece in which a hole is pierced. FIG. 7 is a flowchart illustrating an example of a control operation performed by the machining device.

First, as illustrated in FIG. 7, the machining device 10 (the controller 30) determines a machining mode (step ST1). For example, the machining device 10 confirms a worker's (operator's) operation indicating that any one of cutting, hole piercing, welding, cladding, surface reforming, surface finishing, and laser beam deposition modeling is required to be executed, and determines the machining mode based on the confirmed operation.

Subsequently, the machining device 10 (the controller 30) determines the material or thickness of the workpiece W (step ST2). For example, the machining device (the controller 30) confirms a worker's operation indicating that the material or thickness of the workpiece W, and determines the material or thickness of the workpiece W based on the confirmed operation.

Subsequently, the machining device 10 (the controller 30) determines machining conditions (step ST3). For example, the machining device 10 (the controller 30) confirms a worker's operation indicative of the machining conditions such as a machining position, a machining shape and a machining depth in the process of machining the workpiece W according to the machining mode determined in step ST1, and determines the machining conditions such as a machining position, a machining shape, and a machining depth in the machining process for the workpiece W based on the confirmed operation.

Subsequently, the machining device 10 (the controller 30) determines the allowable thickness of a heat-affected layer Wa (refer to FIG. 6) (step ST4). For example, the machining device 10 (the controller 30) acquires the machining mode determined in step ST1, the material or thickness of the workpiece W determined in step ST2, and the machining conditions determined in step ST3, and determines the allowable thickness of the heat-affected layer Wa with reference to a control map (machining conditions control map) that is configured to determine a correlation between the allowable thickness of the heat-affected layer Wa and other factors (the machining mode, the material or thickness of the workpiece W, and the machining conditions).

Subsequently, the machining device 10 (the controller 30) determines the allowable rotating speed and the allowable rotating radius of the laser beam L (step ST5). For example, the machining device 10 (the controller 30) determines the allowable rotating speed range and the allowable rotating radius range of the laser beam L which do not allow a thickness TH of the heat-affected layer Wa to exceed the allowable thickness with reference to a control map (rotating conditions control map) that is configured to determine a correlation between the thickness TH (refer to FIG. 6) of the heat-affected layer Wa and other factors (the rotating speed and the rotating radius R of the laser beam L) based on the allowable thickness of the heat-affected layer Wa determined in step ST4. When the machining mode determined in step ST1 is hole piercing, only the rotating speed may be determined in step ST5 because the rotating radius R is not required.

Subsequently, the machining device 10 (the controller 30) determines the rotational speed of the first prism 51 and the second prism 52 and a phase angle difference therebetween (step ST6). For example, a rotating speed within the allowable rotating speed range of the laser beam L determined in step ST5 is determined as the rotational speed of the first prism 51 and the second prism 52 by the machining device 10 (the controller 30). In addition, with reference to a control map (phase angle control map) that is configured to determine a correlation between the rotating radius R of the laser beam L, and the phase angle difference between the first prism 51 and the second prism 52, a phase angle difference within the allowable rotating radius range of the laser beam L determined in step ST5 is determined as the phase angle difference between the first prism 51 and the second prism 52 by the machining device 10 (the controller 30).

Subsequently, the machining device 10 (the controller 30) determines a laser beam output (step ST7). For example, the machining device 10 (the controller 30) acquires the allowable thickness of the heat-affected layer Wa determined in step ST4, selects a peak output and pulse width of the laser beam L with reference to a control map (laser beam output control map) that is configured to determine a correlation between the thickness TH of the heat-affected layer Wa and an output of the laser beam L, and determines a laser beam output.

Subsequently, the machining device 10 (the controller 30) determines assist gas ejection conditions (step ST8). For example, the machining device 10 (the controller 30) acquires the allowable thickness of the heat-affected layer Wa determined in step ST4, selects the type, pressure, mixing ratio, and the like of the assist gas with reference to a control map (gas conditions control map) that is configured to determine a correlation between the allowable thickness of the heat-affected layer Wa and other factors (type, pressure, mixing ratio, and the like of the assist gas), and determines the assist gas ejection conditions.

Subsequently, the machining device 10 (the controller 30) machines the workpiece W (step ST9). For example, the machining device 10 (the controller 30) machines the workpiece W in the following sequence: based on the assist gas ejection conditions determined in step ST8, the assist gas is supplied from the assist gas supply source 79, and is ejected via the nozzle 38, the laser beam oscillator 12 is oscillated based on the laser beam output determined in step ST7, the laser beam L is emitted, the rotation of the first hollow shaft motor 59 and the second hollow shaft motor 61 is adjusted based on the rotational speed and the phase angle difference determined in step ST6, and the workpiece W is irradiated with the laser beam L. The machining device 10 (the controller 30) performs a machining process for the workpiece W according to steps ST1 to ST9.

When the machining mode determined in step ST1 is hole piercing, the laser beam L emitted from the laser beam oscillator 12 in step ST9 is incident onto the incident end of the irradiating head 16 via the guiding optical system 14. Then, as illustrated in FIGS. 2, 5, and 6, the laser beam L is refracted by the first prism 51 and the second prism 52 which rotate in the direction of arrow c at the rotational speed and the phase angle difference determined in step ST6, and a position is irradiated with the emitted laser beam L, in which the position is offset from the center P of the optical path that is coaxial with the optical axis OA of the laser beam L before being refracted. When the first prism 51 and the second prism 52 rotate at the same rotational frequency in this state, the laser beam irradiation point is rotated around the center P of the rotary axis in the optical path which is coaxial with the optical axis OA of the laser beam L before being refracted, and the irradiation position IP of the laser beam L moves on an imaginary circle IC having the center P as the center of rotation. As a result, a hole Wb is pierced in the workpiece W. When the machining mode determined in step ST1 is hole piercing, a hole diameter is substantially determined by a set value. In contrast, in welding, cladding, or the like, it is also possible to use the rotating radius R in addition to the rotating speed so as to control the heat-affected layer Wa or the amount of debris onto the top and back surfaces of the workpiece W.

Figure 8:
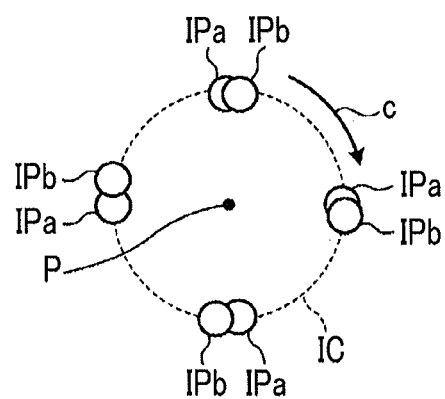
FIG. 8 is a view illustrating a laser beam irradiation operation performed by the machining device.
Figure 9:
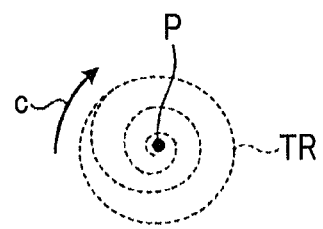
FIG. 9 is a schematic view illustrating an example of the track of a laser beam with which the machining device irradiates a workpiece.
Figure 10:
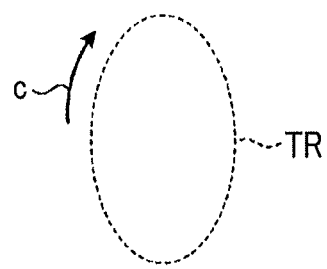
FIG. 10 is a schematic view illustrating an example of the track of a laser beam with which the machining device irradiates a workpiece.
Figure 11:
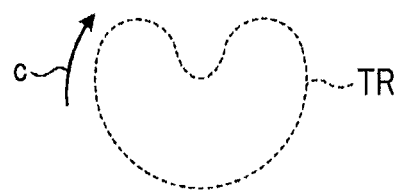
FIG. 11 is a schematic view illustrating an example of the track of a laser beam with which the machining device irradiates a workpiece.
Figure 12:
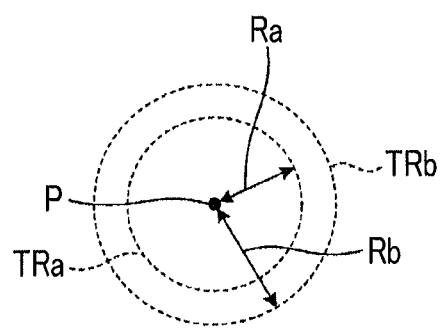
FIG. 12 is a schematic view illustrating an example of the track of a laser beam when the machining device pierces a hole in a workpiece over a plurality of cycles.
Figure 13:
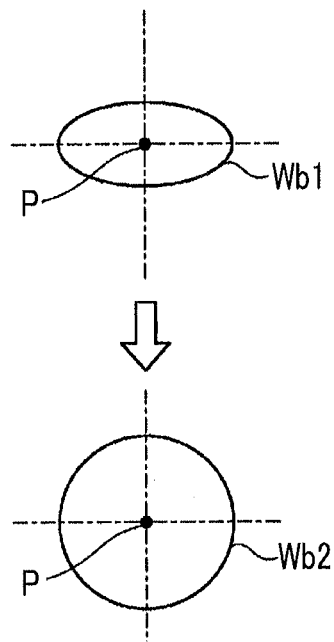
FIG. 13 is a schematic view illustrating an example of when the track of a laser beam, with which a workpiece is irradiated, is corrected to form a true circular shape.
Figure 14:
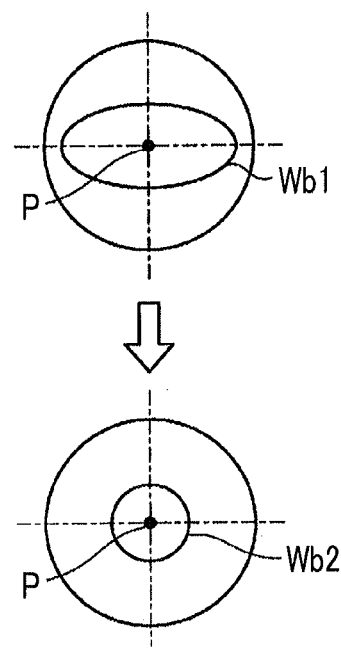
FIG. 14 is a schematic view illustrating an example of when a rotating radius is corrected while the track of a laser beam, with which a workpiece is irradiated, is corrected to form a true circular shape.
Figure 15:
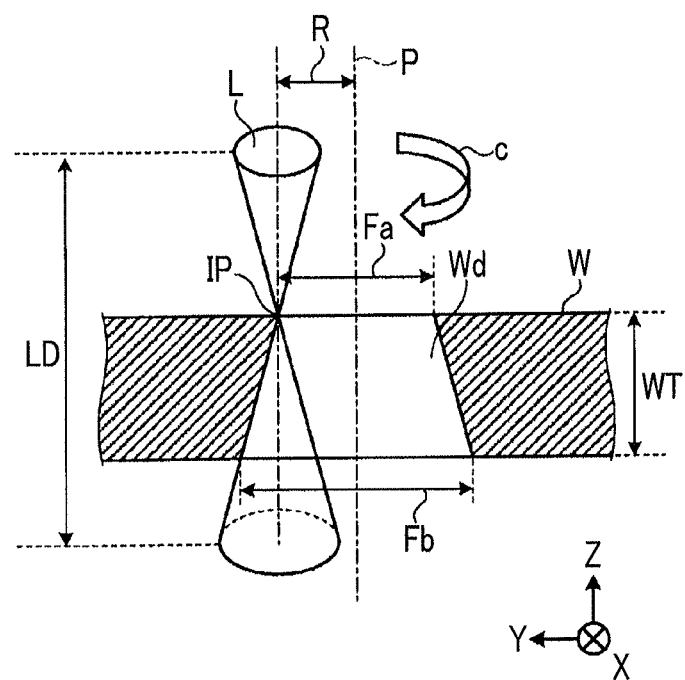
FIG. 15 is a view illustrating a taper correction operation in hole piercing.
Figure 16:
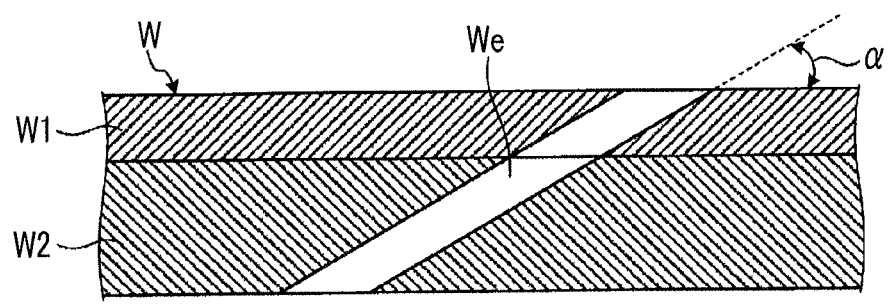
FIG. 16 a sectional view of a thin plate-like workpiece in which an inclined hole is pierced.
Figure 17:
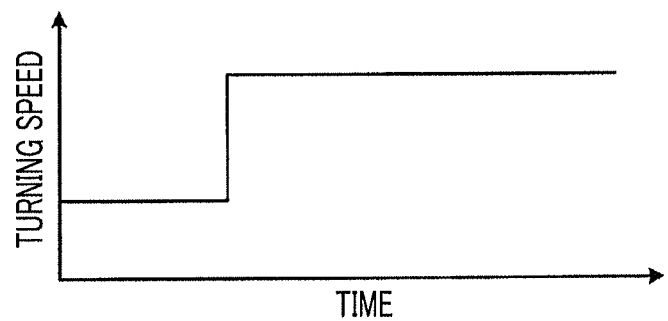
FIG. 17 is a graph illustrating an operation of piercing the inclined hole in a workpiece.
Figure 18:
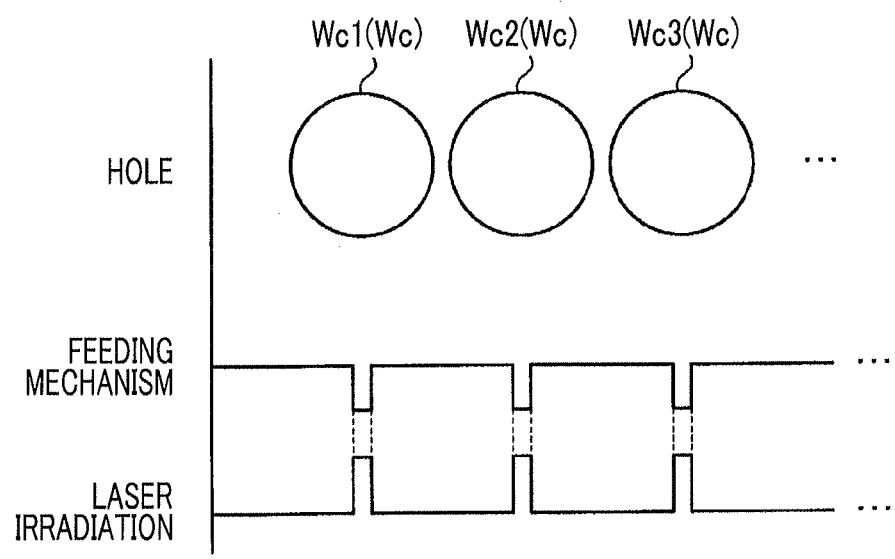
FIG. 18 is a view illustrating an operation of continuously piercing holes in a workpiece.
Figure 19:
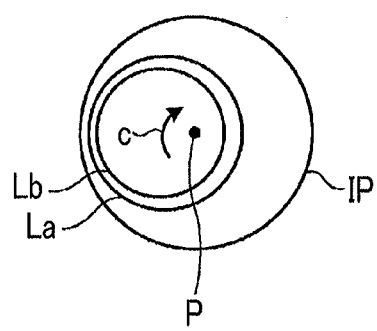
FIG. 19 is a view illustrating an operation when the phase angle of a prism is set to zero.
Figure 20:
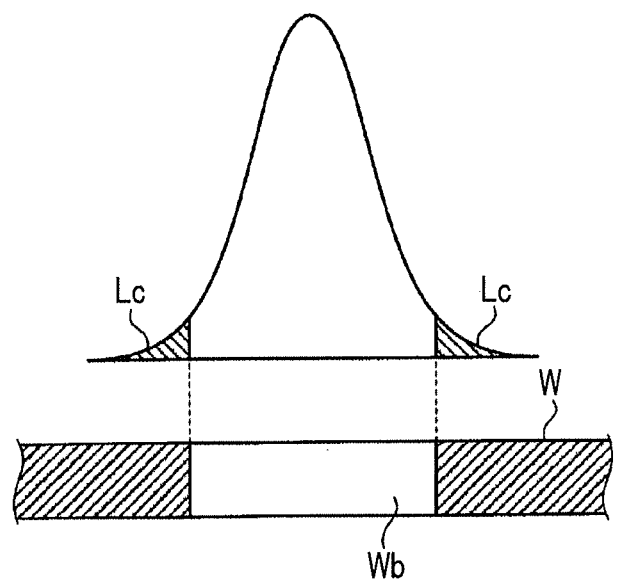
FIG. 20 is a graph illustrating cutting the tail-ends of the energy distribution of a laser beam.

Subsequently, a laser beam irradiation operation, in which the machining device 10 irradiates the workpiece W with the laser beam L, will be described with reference to FIGS. 8 to 20. FIG. 8 is a view illustrating a laser beam irradiation operation performed by the machining device. FIG. 9 is a schematic view illustrating an example of the track of a laser beam with which the machining device irradiates a workpiece. FIG. 10 is a schematic view illustrating an example of the track of a laser beam with which the machining device irradiates a workpiece. FIG. 11 is a schematic view illustrating an example of the track of a laser beam with which the machining device irradiates a workpiece. FIG. 12 is a schematic view illustrating an example of the track of a laser beam when the machining device pierces a hole in a workpiece over a plurality of cycles. FIG. 13 is a schematic view illustrating an example of when the track of a laser beam, with which a workpiece is irradiated, is corrected to form a true circular shape. FIG. 14 is a schematic view illustrating an example of when a rotating radius is corrected while the track of a laser beam, with which a workpiece is irradiated, is corrected to form a true circular shape. FIG. 15 is a view illustrating a taper correction operation in hole piercing. FIG. 16 a sectional view of a thin plate-like workpiece in which an inclined hole is pierced. FIG. 17 is a graph illustrating an operation of piercing the inclined hole in a workpiece. FIG. 18 is a view illustrating an operation of continuously piercing holes in a workpiece. FIG. 19 is a view illustrating an operation when the phase angle of a prism is set to zero. FIG. 20 is a graph that illustrates cutting the tail-ends of the energy distribution of a laser beam.

When the machining device 10 irradiates the workpiece W with the laser beam L while turning on and off the laser beam L at a constant frequency, as illustrated in FIG. 8, the machining device 10 preferably sets the ON/OFF frequency of the laser beam L to non-integer multiples of the rotating frequency of the irradiation position IP. That is, the machining device 10 can irradiate an irradiation position IPa with the laser beam L for the first round, and irradiate an irradiation position IPb with the laser beam L for the second round by offsetting the ON/OFF frequency of the laser beam L and the rotating frequency of the irradiation position IP relative to each other. That is, similarly, the machining device 10 can sequentially offset one irradiation position relative to the other by repeatedly turning on and off the laser beam L for the third and subsequent rounds. Accordingly, the machining device 10 can offset the irradiation position of the laser beam L relative to the last irradiation position for each round, and can more efficiently irradiate a target machining region of the workpiece W with the laser beam L.

When the machining device 10 rotates the first prism 51 and the second prism 52 while continuously changing the phase angle difference between the first prism 51 and the second prism 52, as illustrated in FIG. 9, the machining device 10 can irradiate the workpiece W with the laser beam L along a spiral track TR on which the laser beam L gradually moves away from the center P. Accordingly, the machining device 10 can machine the workpiece W with high precision by spirally irradiating the workpiece W with the laser beam L, in which the workpiece W has a thickness through which the laser beam L cannot easily pass.

Similarly, as illustrated in FIGS. 10 and 11, the machining device 10 can irradiate the workpiece W with the laser beam L along a track TR having the shape of an ellipse or heart. That is, the machining device 10 can irradiate the workpiece W with the laser beam L along various shapes of track TR by continuously changing the phase angle difference between the first prism 51 and the second prism 52 while rotating the first prism 51 and the second prism 52. That is, the machining device 10 can irradiate the workpiece W with the laser beam L along various shapes of track TR by controlling the rotation of the first prism 51 and the second prism 52 and the phase angle difference therebetween.

When the machining device 10 calculates the rotating radius R of the laser beam L appropriate for a machining process for the workpiece W based on theoretical optical values, and then corrects the rotating radius R while taking the heat-affected layer Wa into consideration, as illustrated in FIG. 12, the machining device 10 can irradiate the workpiece W with the laser beam L along a circular track Ra having a hole diameter smaller than that of a target machined hole for the first round, and irradiate the workpiece W with the laser beam L along a circular track TRb having a hole diameter smaller than that of the target machined hole for the second round. In this case, preferably, a rotating radius Ra of the laser beam L for the first round is set to a rotating radius that is smaller than the radius of the target hole, and a rotating radius Rb of the laser beam L for the second round is set to a rotating radius that is corrected in order for the thickness TH of the heat-affected layer Wa in the target hole to be within an allowable thickness range after the rotating radius required to pierce the target hole is calculated based on the theoretical optical values. Accordingly, a large amount of heat spreads for the first round for which the workpiece W is initially irradiated with the laser beam L; however, the machining device 10 can reduce the amount of spreading heat by piercing a hole smaller than the target hole for the first round, and pierce the target hole for the second round. That is, since the machining device 10 can perform rough machining for the first round, and perform finishing for the second round, the machining device 10 can perform high-precision machining.

When the machining device 10 adjusts the track TR of the laser beam L such that the track TR of the laser beam L forms an approximately true circular shape (when the roundness of the track TR is corrected), as illustrated in FIG. 13, first, the machining device 10 pierces a pilot hole Wb1 in the workpiece W, detects the roundness of the pilot hole Wb1 based on data of an image of the pilot hole Wb1 captured by the imaging device 40, calculates a change in the pattern (continuously changing phase angle differences at one cycle of rotation of the laser beam L) of the phase angle difference between the first prism 51 and the second prism 52 based on the detected roundness, which is required to make the track TR of the irradiation position IP of the laser beam L form a true circular shape, and controls the rotation of the first prism 51 and the second prism 52 according to the calculated change in the pattern of the phase angle difference, and thus the machining device 10 can irradiate the workpiece W with the laser beam L while rotating the laser beam L along a true circle. As a result, the machining device 10 can pierce a desirable hole Wb2 in a true circular shape.

When the track TR of the laser beam L is corrected to form a true circular shape, and a hole diameter is corrected (hole-diameter correction), as illustrated in FIG. 14, the machining device 10 detects the roundness and size (hole diameter) of the pilot hole Wb1 based on data of an image of the pilot hole Wb1 captured by the imaging device 40, calculates a change in the pattern (continuously changing phase angle differences at one cycle of rotation of the laser beam L) of the phase angle difference between the first prism 51 and the second prism based on the detected roundness and hole diameter, which is required to form a true circular shape having a predetermined diameter for the track TR of the irradiation position IP of the laser beam L, and controls the rotation of the first prism 51 and the second prism 52 according to the calculated change pattern of the phase angle difference, and thus the machining device 10 can irradiate the workpiece W with the laser beam L while rotating the laser beam L along a true circular shape of predetermined size. As a result, the machining device 10 can pierce a desirable hole Wb2 of predetermined size that has a true circular shape.

When the machining device 10 pierces a tapered hole Wd, the hole diameter of which increases toward a leading edge in an irradiation direction of the laser beam L, as illustrated in FIG. 15, the machining device 10 detects the gap between the focal point of the laser beam L and the workpiece W using the gap detector 41, focuses the laser beam L on the irradiation position IP of the laser beam L by adjusting a relative position therebetween in the Z-axis direction using the Z-axis movement mechanism 28 based on the detected gap, and then can irradiate the workpiece W with the laser beam L having a focal depth LD greater than a plate thickness WT of the workpiece W while rotating the irradiation position IP around the center P of rotation of the rotating radius R in the direction of arrow c. Accordingly, the machining device 10 can pierce the tapered hole Wd, in which a hole diameter Fb on a back side of the workpiece W is larger than a hole diameter Fa on a top side (that is, a side with which the laser beam L is irradiated) thereof.

When the machining device 10 pierces the tapered hole Wd, the hole diameter of which decreases toward the leading edge in the irradiation direction of the laser beam L, the machining device 10 focuses the laser beam L on the back side of the workpiece W by adjusting the relative position in the Z-axis direction using the Z-axis movement mechanism 28 based on the detected gap, and then can irradiate the workpiece W with the laser beam L while rotating the irradiation position IP around the center P of rotation of the rotating radius R in the direction of arrow c. Accordingly, the machining device 10 can pierce the tapered hole Wd, in which the hole diameter Fa on the top side of the workpiece W is larger than the hole diameter Fb on the back side thereof. That is, the machining device 10 can pierce a desired shape for the tapered hole Wd by controlling the relative position on the workpiece W in the Z-axis direction using the Z-axis movement mechanism 28, based on the gap detected by the gap detector 41.

When the machining device 10 corrects the tapered shape of the tapered hole Wd (taper correction), the machining device 10 can pierce the hole Wb (refer to FIG. 6), in which the hole diameter Fa on the top side of the workpiece W is equal to the hole diameter Fb on the back side thereof, by controlling the relative position on the workpiece W in the Z-axis direction using the Z-axis movement mechanism 28 based on the detected gap. That is, based on the gap detected by the gap detector 41, the machining device 10 can correct the tapered hole Wd such that the tapered hole Wd becomes a straight hole.

When the machining device 10 pierces an inclined hole We in the workpiece W having layers made of a plurality of different materials, for example, when the machining device 10 pierces the inclined hole We, a tilt angle α of which is 20° to 40° relative to the thin plate-like workpiece W having a ceramic layer W1 and a metal layer W2, as illustrated in FIGS. 16 and 17, the machining device 10 sets the index angle of the nozzle 38 to an angle of 20° to 40° using the index mechanism 39, and pierces a hole in the ceramic layer W1 while decreasing the rotating speed of the irradiation laser beam L relative to that when piercing a hole in the metal layer W2, and increasing energy per unit time at the irradiation position IP. In contrast, the machining device 10 pierces a hole in the metal layer W2 while increasing the rotating speed of the irradiation laser beam L relative to that when piercing a hole in the ceramic layer W1, and decreasing energy per unit time at the irradiation position IP. Accordingly, the machining device 10 can pierce a hole in the ceramic layer W1 with relatively low thermal conductivity while reducing the thickness TH of the heat-affected layer Wa, and pierce a hole in the metal layer W2 with relatively high thermal conductivity while reducing the thickness TH of the heat-affected layer Wa. In addition, the machining device 10 can reduce an amount of time required to pierce a hole in each of the ceramic layer W1 and the metal layer W2.

The machining device 10 irradiates the workpiece W with the laser beam L so that the track TR of the laser beam L on the metal layer W2 is small relative to the track TR of the laser beam L on the ceramic layer W1 in the vicinity of the boundary between the ceramic layer W1 and the metal layer W2, and as a result, the track TR of the laser beam L on the metal layer W2 forms a non-true circular shape. As a result, the machining device 10 can reduce the thickness TH of the heat-affected layer Wa of the metal layer W2, and can reduce the speed of progress of hole piercing in the metal layer W2, the hole-piercing speed of which is high relative to that of the ceramic layer W1. That is, the machining device 10 can pierce a hole in each of the ceramic layer W1 and the metal layer W2 in the same manner. That is, the machining device 10 can perform multiple-stage machining with machining conditions appropriate for each of the ceramic layer W1 and the metal layer W2, and can pierce a high-quality straight hole that passes through the ceramic layer W1 and the metal layer W2 in a straight line.

In multiple-stage machining, the machining device 10 can machine the workpiece W with more appropriate machining conditions by using a type of assist gas appropriate for each stage.

The machining device 10 can easily pierce a straight hole by performing the taper correction when piercing an inclined hole in the thin plate-like workpiece W.

When the machining device 10 pierces a plurality of holes Wc in the workpiece W with a gap between the holes Wc, as illustrated in FIG. 18, the machining device 10 moves the workpiece W to a hole piercing position using a feeding mechanism (the X-axis movement mechanism 22, the Y-axis movement mechanism 26, or the Z-axis movement mechanism 28), stops the feeding mechanism at the hole piercing position, and forms a hole Wc1 by irradiating the workpiece W with the laser beam L. Then, the machining device 10 moves the workpiece W to a subsequent hole piercing position using the feeding mechanism, stops the feeding mechanism at the subsequent hole piercing position, and forms a hole Wc2 by irradiating the workpiece W with the laser beam L. Then, the machining device 10 moves the workpiece W to a subsequent hole piercing position using the feeding mechanism, stops the feeding mechanism at the subsequent hole piercing position, and forms a hole Wc3 by irradiating the workpiece W with the laser beam L. Thereafter, the machining device 3 continuously pierces holes by repeating the same process. That is, since the machining device 10 can pierce a hole with only the irradiation of the laser beam L to the workpiece W from the irradiating head 16, the machining device 10 can stop the mechanical operation of the feeding mechanism when piercing the hole. That is, since the machining device 10 can reduce an amount of time when the mechanical operation of the feeding mechanism is stopped by irradiating the workpiece W with the laser beam L while the mechanical operation of the feeding mechanism is stopped, the machining device 10 can reduce a stand-by time (stop time) of the feeding mechanism. Accordingly, the machining device 10 can perform a machining operation at a high speed, and thus can reduce a machining time.

When the machining device 10 pierces the plurality of holes Wc in the workpiece W with a gap between the holes Wc, the machining device 10 irradiates the workpiece W with the laser beam L while rotating the laser beam L along an elliptical shape in which the rotating radius R in a movement direction (an arbitrary direction in the X-Y plane) of the workpiece W is reduced relative to those in other directions, and thus the machining device 10 can continuously pierce a substantially true circular shape for the holes Wc (including a true circular shape for the holes Wc) while continuously moving the workpiece W without stopping the feeding mechanism.

As illustrated in FIG. 19, the machining device 10 can set the amount of offset between the center P and the irradiation position IP to zero by setting the phase angle difference between the first prism 51 and the second prism 52 to 0°. When the amount of offset between the center P and the irradiation position IP is set to zero, the machining device 10 can rotate the first prism 51 and the second prism 52 while the rotational speeds of the first prism 51 and the second prism 52 are synchronized with each other. Accordingly, a deviation in the energy distribution of the laser beam L at the irradiation position IP may occur with very small offset in an optical system such as the laser beam oscillator 12, the guiding optical system 14, or the collimating optical system 34, even if the workpiece W is irradiated with a relatively low-intensity laser beam La and a relatively high-intensity laser beam Lb which are offset from the center P, the machining device 10 can rotate the relatively low-intensity laser beam La and the relatively high-intensity laser beam Lb around the center P in the direction of arrow c. That is, since the machining device 10 can equalize energy densities in the spot of the laser beam L at the irradiation position IP, the machining device 10 can uniformize unevenness in energy in an outer circumferential portion of the spot (the irradiation position IP) of the laser beam L, and can irradiate the workpiece W with the laser beam L which has uniformized energy. That is, since the machining device 10 prevents unevenness in energy from occurring in the outer circumferential portion of the spot of the laser beam L during cutting, which adversely affects a cut surface, the machining device 10 can maintain cutting quality (the quality of the cut surface) even if a cutting direction (cutting path) is changed. Similarly, for example, the machining device 10 can maintain machining quality (welding quality) during welding even if a welding direction (machining path) is changed.

Since the irradiating head 16 is provided with a tail-end cutting optical system that cuts tail-ends Lc of the energy distribution (that is, energy distribution in the section of the laser beam L in the irradiation direction) of the laser beam L with which the workpiece W is irradiated, as illustrated in FIG. 20, the machining device 10 can relatively increase energy in the outer circumferential portion of the spot of the laser beam L with which the workpiece W is irradiated. Accordingly, the machining device 10 can sharpen an edge end portion of the hole Wb (the hole Wc, the tapered hole Wd, the inclined hole We), an edge end portion of a cut surface, or the like, and improve machining quality. The following can be used as the tail-end cutting optical system: an optical system that is configured to shield part of the optical path of the laser beam L in the laser beam rotating unit 35 using an aperture; an optical system that is configured to shield part of the optical path of the laser beam L using a housing of the irradiating head 16, or the like.

Since the machining device 10 can perform a machining process by detecting the gap between the focal point of the irradiation laser beam L and the workpiece W using the gap detector 41 while observing a machined portion of the workpiece W using the imaging device 40, the machining device can easily perform a machining adjustment operation or the like.

The first rotation mechanism 53, the second rotation mechanism 54, and the index mechanism 39 are respectively driven by the first hollow shaft motor 59, the second hollow shaft motor 61, and the hollow shaft motor 82, and thus each of the first rotation mechanism 53, the second rotation mechanism 54, and the index mechanism 39 does not have a backlash. Therefore, the machining device 10 can very precisely control the phase angle difference between the first prism 51 and the second prism 52 using the first rotation mechanism 53 and the second rotation mechanism 54, and can very precisely control the index angle of the nozzle 38 using the index mechanism 39. Accordingly, the machining device 10 can very precisely control the rotating radius R of the laser beam L with which the workpiece W is irradiated, and can very precisely control the index angle of the laser beam L with which the workpiece W is irradiated.

Since the assist gas supply pipings 42a and 81a are internal pipes that are provided inside the irradiating head 16, in the machining device 10, debris from the machined portion of the workpiece W can be prevented from adhering onto the assist gas supply pipings 42a and 81a, and the assist gas supply pipings 42a and 81a can be prevented from being damaged.

The machining device 10 preferably modulates the power of the laser beam L at every rotation of the laser beam L relative to the workpiece W. For example, the machining device 10 modulates the power (output) of the laser beam L at every rotation of the laser beam L relative to a machined portion of the workpiece W so as to prevent an increase in the size of the heat-affected layer Wa. The machining device 10 outputs the laser beam L appropriate for a machining process for the workpiece W using pulse modulation, linear modulation, high-frequency superimposed modulation, or the like when modulating the output of the laser beam L. Accordingly, the machining device 10 can stabilize the machining quality of the workpiece W.

The machining device 10 preferably limits an error in the phase angle difference between the first hollow shaft motor 59 and the second hollow shaft motor 61 to an angle less than 0.1°. That is, the machining device 10 preferably limits an error in the phase angle difference between the first prism 51 and the second prism 52 to an angle less than 0.1. In this case, the controller 30 limits an error in the phase angle difference (determined in step ST6) between the first prism 51 and the second prism 52 to an angle less than 0.1, based on the rotational speed and rotational position (phase angle) of the first spindle 58 and the second spindle 60 which are output from the encoder 68. Accordingly, the machining device 10 can limit the offset of the rotating radius R to an offset less than several tens of μm depending on the optical characteristics of the first prism 51 and the second prism 52, and can machine the workpiece W by precisely irradiating the laser beam L to the workpiece W.

Preferably, the machining device 10 rotates the first prism 51 and the second prism 52 at 20 rpm or greater when the output frequency of the laser beam L is less than 1 kHz, and rotates the first prism 51 and the second prism 52 at 200 rpm or greater when the output frequency of the laser beam L is 1 kHz or greater. That is, preferably, the machining device 10 sets the rotational speed of the laser beam L, with which the workpiece W is irradiated, to 20 rpm or greater when the output frequency of the laser beam L is less than 1 kHz, and sets the rotational speed of the laser beam L to 200 rpm or greater when the output frequency of the laser beam L is 1 kHz or greater.

The machining device 10 can perform machining at a high speed and further improve machining precision by adjusting the rotational speed of the first prism 51 and the second prism 52 in response to the output frequency of the laser beam L. That is, since a relatively high output frequency of the laser beam L relatively increases the energy of the laser beam L with which the workpiece W is irradiated, the machining device 10 rotates the laser beam L at a relatively high speed, and since a relatively low output frequency of the laser beam L relatively decreases the energy of the laser beam L with which the workpiece W is irradiated, the machining device 10 rotates the laser beam L at a relatively low speed. In addition, it is possible to uniformly irradiate the workpiece W with the laser beam L in a predetermined range by rotating the laser beam L, with which the workpiece W is irradiated, at a relatively high speed, and it is possible to prevent the partial concentration of the output of the laser beam L. Accordingly, the machining device 10 can easily control the thickness TH of the heat-affected layer Wa, and improve machining precision. The machining device 10 rotates the laser beam L, with which the workpiece W is irradiated, at a relatively high speed, and thus the machining device 10 can reduce thermal effects (thermal damage) even if the energy of the laser beam L is a relatively high output, reduce the thickness TH of the heat-affected layer Wa, and increase a machining speed while maintaining machining quality.

Since a metal material such as a steel sheet is used as the workpiece W, the machining device 10 can suitably perform cutting, hole piercing, welding, cladding, surface reforming, surface finishing, or laser beam deposition modeling, and can form a more suitable shape of a cut surface. Accordingly, the machining device 10 can improve machining precision. The machining device 10 can prevent the partial concentration of the output of the laser beam L by irradiating the workpiece W with the laser beam L while rotating the laser beam L, and thus can use a high-output laser beam L. Therefore, the machining device 10 can be suitably used for welding or cladding, and can be suitably used to machine a material having high heat resistance.

In the machining device 10, the first hollow shaft motor 59 drives the rotation of the first rotation mechanism 53, the second hollow shaft motor 61 drives the rotation of the second rotation mechanism 54, and thus the radial size of each of the first hollow shaft motor 59 and the second hollow shaft motor 61 can be reduced. Therefore, the size of the irradiating head 16 can be reduced. That is, it is possible to prevent an increase in the size of the machining device 10.

Since the controller 30 determines the rotational speed of the first rotation mechanism 53 and the second rotation mechanism 54, the machining device 10 can machine the workpiece W while limiting the thickness TH of the heat-affected layer Wa to the allowable thickness or less.

Figure 21:
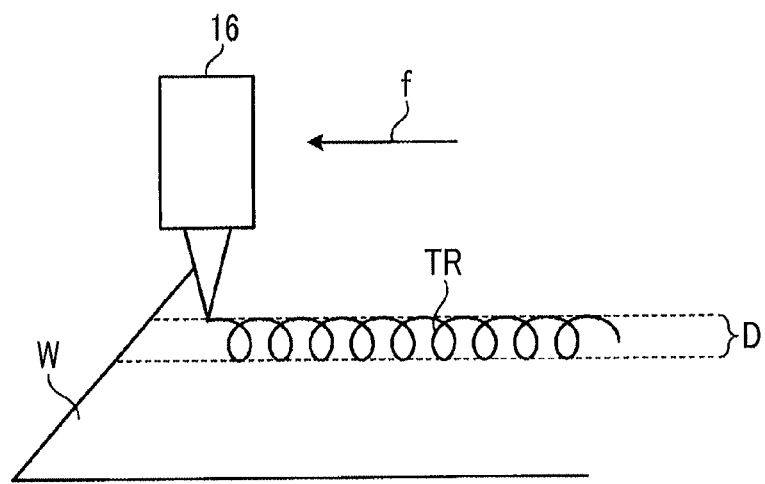
FIG. 21 is a view illustrating a cutting operation performed by the machining device.
Figure 22:
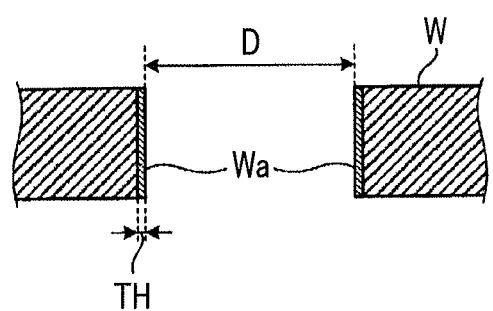
FIG. 22 is a view illustrating a heat-affected layer of the workpiece that is cut.
Figure 23:
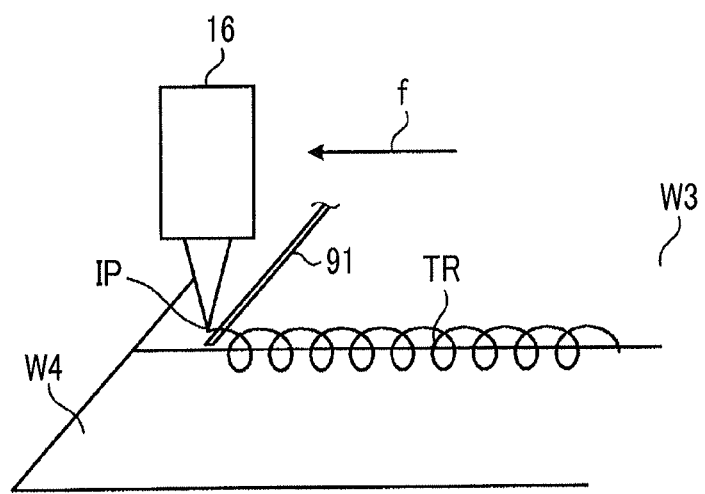
FIG. 23 is a view illustrating a welding operation performed by the machining device.
Figure 24:
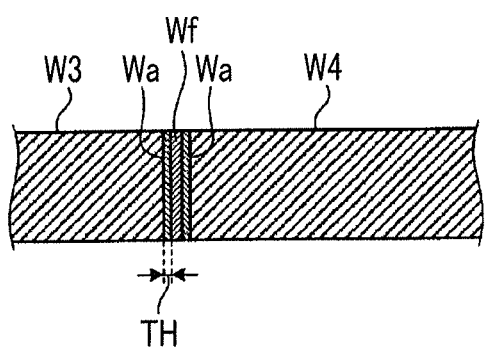
FIG. 24 is a view illustrating a heat-affected layer of the workpiece that is welded.
Figure 25:
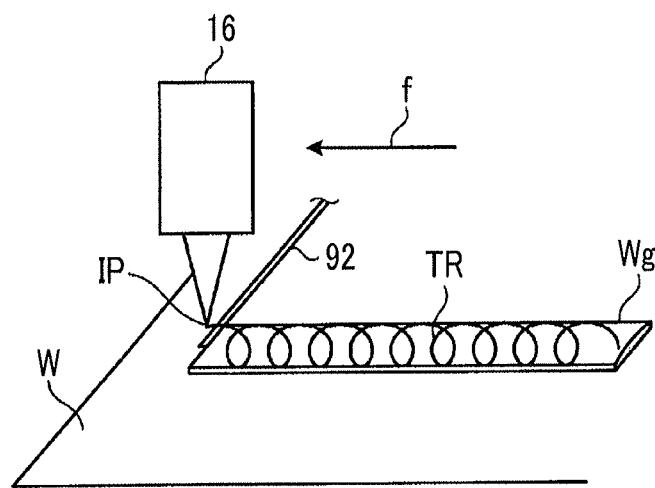
FIG. 25 is a view illustrating a cladding operation performed by the machining device.
Figure 26:
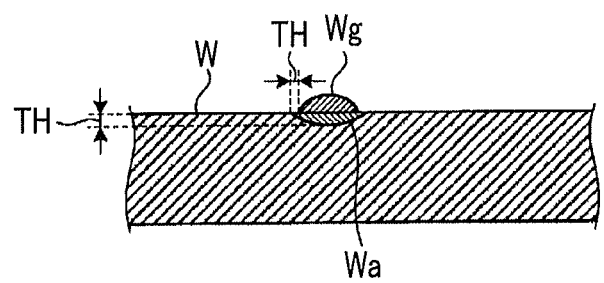
FIG. 26 is a view illustrating a heat-affected layer of the workpiece that is clad.
Figure 27:
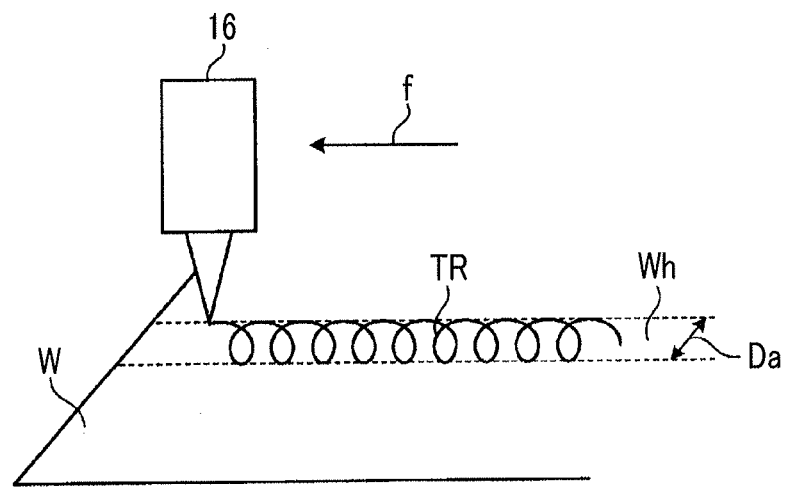
FIG. 27 is a view illustrating a surface reforming operation performed by the machining device.
Figure 28:
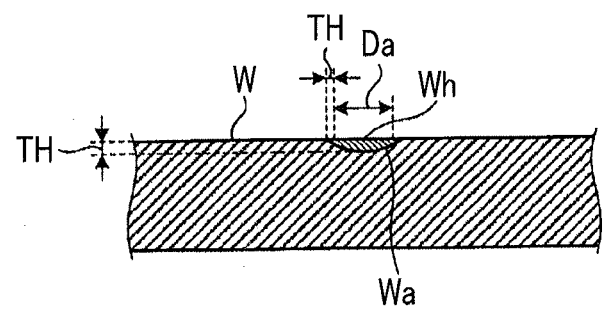
FIG. 28 is a view illustrating a heat-affected layer of a surface treated workpiece.

Subsequently, other examples of machining performed by the machining device 10 will be described with reference to FIGS. 21 to 28. FIG. 21 is a view illustrating a cutting operation performed by the machining device. FIG. 22 is a view illustrating a heat-affected layer of the workpiece that is cut. FIG. 23 is a view illustrating a welding operation performed by the machining device. FIG. 24 is a view illustrating a heat-affected layer of the workpiece that is welded. FIG. 25 is a view illustrating a cladding operation performed by the machining device. FIG. 26 is a view illustrating a heat-affected layer of the workpiece that is clad. FIG. 27 is a view illustrating a surface reforming operation performed by the machining device. FIG. 28 is a view illustrating a heat-affected layer of a surface treated workpiece.

When the machining mode is cutting, as illustrated in FIGS. 21 and 22, the machining device 10 irradiates the workpiece W with the laser beam L in the direction of arrow f while rotating the laser beam L along the track TR by scanning the workpiece W with the irradiating head 16 in the direction of arrow f that is an arbitrary direction in the X-Y plane (horizontal plane). Therefore, the machining device 10 can limit the thickness TH of the heat-affected layer Wa to the allowable thickness or less. Accordingly, the machining device 10 irradiates the workpiece W with the laser beam L to the extent of an irradiation width D, and thus can cut a portion of the irradiation width D from the workpiece W. The machining device 10 controls the rotating speed of the laser beam L, with which the workpiece W is irradiated, by controlling the rotational speed of the first prism 51 and the second prism 52, and thus can control the allowable thickness for the thickness TH of the heat-affected layer Wa.

When the machining mode is welding, as illustrated in FIGS. 23 and 24, the machining device 10 irradiates the workpiece W with the laser beam L in the direction of arrow f while rotating the laser beam L along the track TR by supplying a welding wire 91 or the like to the irradiation position IP of the laser beam L while scanning the workpiece W with the irradiating head 16 in the direction of arrow f (arbitrary direction in the X-Y plane). Accordingly, the machining device 10 can weld an I-shaped groove between one workpiece W3 and another workpiece W4 via a welded portion Wf. The machining device 10 controls the rotating speed of the laser beam L, with which the groove is irradiated, between the one workpiece W3 and the other workpiece W4 by controlling the rotational speed of the first prism 51 and the second prism 52, and thus can control the allowable thickness for the thickness TH of the heat-affected layer Wa.

When the machining mode is cladding, as illustrated in FIGS. 25 and 26, the machining device 10 irradiates the workpiece W with the laser beam L in the direction of arrow f while rotating the laser beam L along the track TR by supplying a cladding wire 92 or the like to the irradiation position IP of the laser beam L while scanning the workpiece W with the irradiating head 16 in the direction of arrow f (arbitrary direction in the X-Y plane). Accordingly, the machining device 10 can form a cladded portion Wg on the workpiece W. The machining device 10 controls the rotating speed of the laser beam L, with which the workpiece W is irradiated, by controlling the rotational speed of the first prism 51 and the second prism 52, and thus can control the allowable thickness for the thickness TH of the heat-affected layer Wa.

When the machining mode is surface reforming, as illustrated in FIGS. 27 and 28, the machining device 10 irradiates the workpiece W with the laser beam L in the direction of arrow f while rotating the laser beam L along the track TR by scanning the workpiece W with the irradiating head 16 in the direction of arrow f (arbitrary direction in the X-Y plane). Accordingly, the machining device 10 irradiates the workpiece W with the laser beam L to the extent of an irradiation width Da, and thus can form a surface treated portion Wh, the surface of which is treated in the workpiece W, for example, the machining device 10 can smooth the surface of the workpiece W, or can refine a material grain on the surface of the workpiece W. The machining device 10 controls the rotating speed of the laser beam L, with which the workpiece W is irradiated, by controlling the rotational speed of the first prism 51 and the second prism 52, and thus can control the allowable thickness for the thickness TH of the heat-affected layer Wa.

In the embodiment, the heat-affected layer Wa of the workpiece W includes at least one of a re-melted layer, an oxidized layer, cracks, and dross which are formed due to the laser beam L with which the workpiece W is irradiated. During machining, part of the solid of the workpiece W is liquefied due to the irradiation of the laser beam L, and is re-solidified such that the re-melted layer is formed. The re-melted layer is changed depending on the machining mode, and when the machining mode is hole piercing or cutting, the re-melted layer is not formed in the irradiation direction (travel direction) of the laser beam L, but is formed in a direction perpendicular to the irradiation direction (travel direction) of the laser beam L. In addition, the re-melted layer is formed on an inner circumferential surface of the hole Wb formed due to the irradiation of the laser beam L, or on a cut surface of the workpiece W that is cut. When the machining mode is welding, cladding, surface reforming, surface finishing, or laser beam decomposition modeling, the re-melted layer is formed in the irradiation direction (travel direction) of the laser beam L and in the direction perpendicular to the irradiation direction, and is formed in the vicinity of or on a side below the welded portion Wf, the vicinity of or a lower side of the cladded portion Wg, or the vicinity of or a side below the surface treated portion Wh, in which the welded portion Wf, the cladded portion Wg, and the surface treated portion Wh are formed due to the irradiation of the laser beam L.

When the workpiece W is a metal or the like, and oxygen is used as the assist gas, the oxidized layer is an oxide film that is formed on the inner circumferential surface of the hole Wb or the cut surface of the workpiece W. The cracks are fine cracks (microcracks) that occur on the inner circumferential surface of the hole Wb or the cut surface of the workpiece W when rapidly heated due to the irradiation of the laser beam L. During the piercing of a hole in or the cutting of the workpiece W, the material of the workpiece W is liquefied into a molten material, and the molten material is solidified in a state where the molten material adheres to the inner circumferential surface of the hole Wb or the cut surface of the workpiece W. The dross is an adhering material formed in this manner. The thickness TH of the heat-affected layer Wa of the workpiece W includes the thickness of the re-melted layer, the thickness of the oxide film, the depth of the crack, and the thickness of the adhering material.

When the workpiece W undergoes a machining process including at least one of cutting, hole piercing, welding, cladding, surface reforming, surface finishing, and laser beam deposition modeling, the allowable thickness represents a thickness that can be allowed for the thickness TH of the heat-affected layer Wa of the inner circumferential portion of the hole Wb, a cut portion, or the welded portion Wf, or the thickness TH of the heat-affected layer Wa of the cladded portion Wg or the surface treated portion Wh in the workpiece W as a machined product.

The allowable thickness changes depending on the machining mode, and when the machining mode is hole piercing or cutting, the allowable thickness is a length in the direction perpendicular to the irradiation direction (travel direction) of the laser beam L. When the machining mode is welding, cladding, surface reforming, surface finishing, or laser beam deposition modeling, the allowable thickness is a length in the irradiation direction (travel direction) of the laser beam L, or in the direction perpendicular to the irradiation direction of the laser beam L.

Second Embodiment

Figure 29:
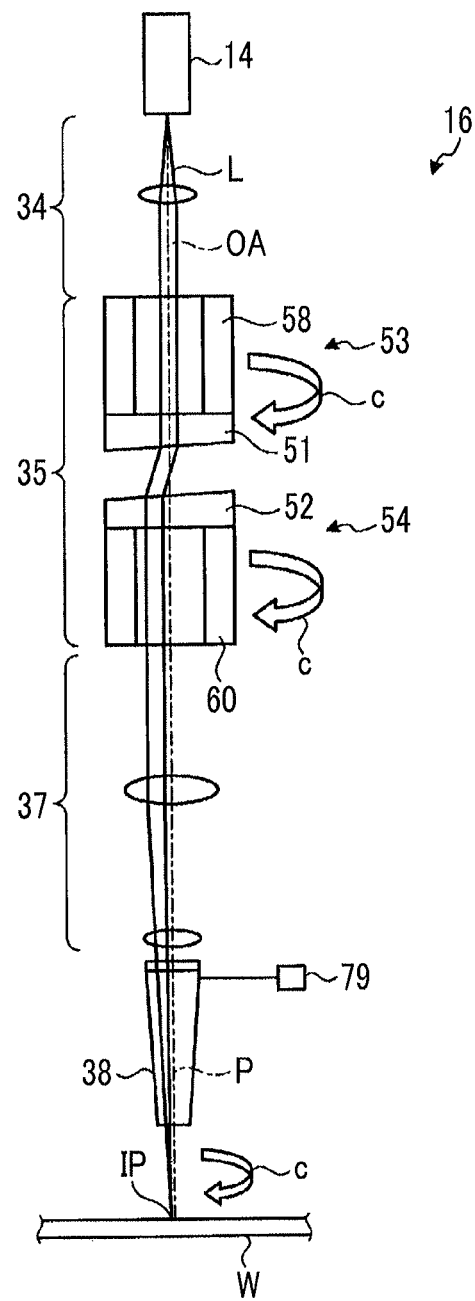
FIG. 29 is a schematic view illustrating the configuration of the irradiating head according to the second embodiment.

Subsequently, the irradiating head 16 according to a second embodiment is described. FIG. 29 is a schematic view illustrating the configuration of the irradiating head according to the second embodiment. Since the basic configuration of the irradiating head 16 according to the second embodiment is the same as that of the irradiating head 16 of the machining device 10 according to the first embodiment, the configuration of the identical parts will not be described. In the irradiating head 16 according to the second embodiment, the optical paths of the laser beam L in the collimating optical system 34, the laser beam rotating unit 35, and the converging optical system 37 are connected to other in a straight line (coaxially) such that the optical paths are integrated.

As illustrated in FIG. 29, the irradiating head 16 has the collimating optical system 34; the laser beam rotating unit 35; the converging optical system 37; and the nozzle 38. In the irradiating head 16, the collimating optical system 34, the laser beam rotating unit 35, the converging optical system 37, and the nozzle 38 are disposed in the sequence as listed from an upstream side to a downstream side of the optical path of the laser beam L output from the guiding optical system 14. The irradiating head 16 irradiates the workpiece W with the laser beam L output from the guiding optical system 14, in which the workpiece W faces the nozzle 38.

The laser beam rotating unit 35 has the hollow cylindrical first spindle 58 and the hollow cylindrical second spindle 60, in which the rotation of the first spindle 58 is driven by the first rotation mechanism 53, and the first spindle 58 supports the first prism 51, and the rotation of the second spindle 60 is driven by the second rotation mechanism 54, and the second spindle 60 supports the second prism 52. Accordingly, the irradiating head 16 rotates the irradiation position IP of the laser beam L by rotating the laser beam L, with which the workpiece W is irradiated, around the center P of the optical path.

The irradiating head 16 controls the rotational speed of the first rotation mechanism 53 and the second rotation mechanism 54, and the phase angle difference between the first prism 51 and the second prism 52, and thus can change the rotating radius R, rotating speed, track TR, and the like of the laser beam L, with which the workpiece W is irradiated, corresponding to the machining mode or the like.

The irradiating head 16 has the cooling mechanism 55; the cooling mechanism 76; the imaging device 40; the gap detector 41; and the like, in which the cooling mechanism 55 is configured to cool the first prism 51 and the second prism 52, and the cooling mechanism 76 is configured to cool the converging optical system 37. Similar to the irradiating head 16 according to the first embodiment, the irradiating head 16 can perform machining by controlling the phase angle difference between the first prism 51 and the second prism 52.

[Test Example]

Figure 30:
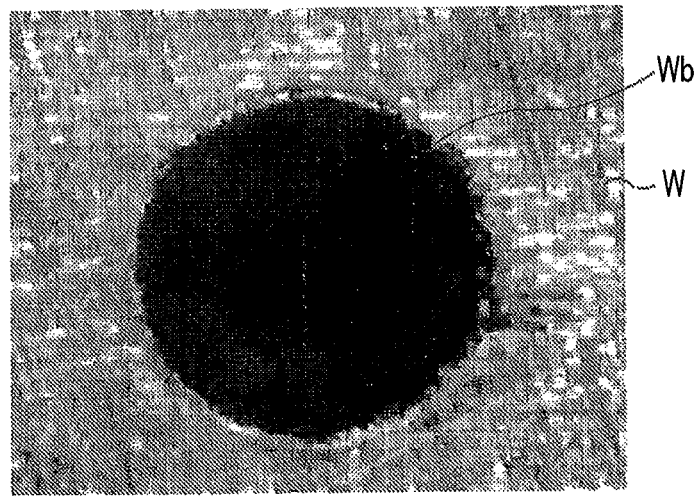
FIG. 30 illustrates an example in which a workpiece is machined by the machining device.
Figure 31:
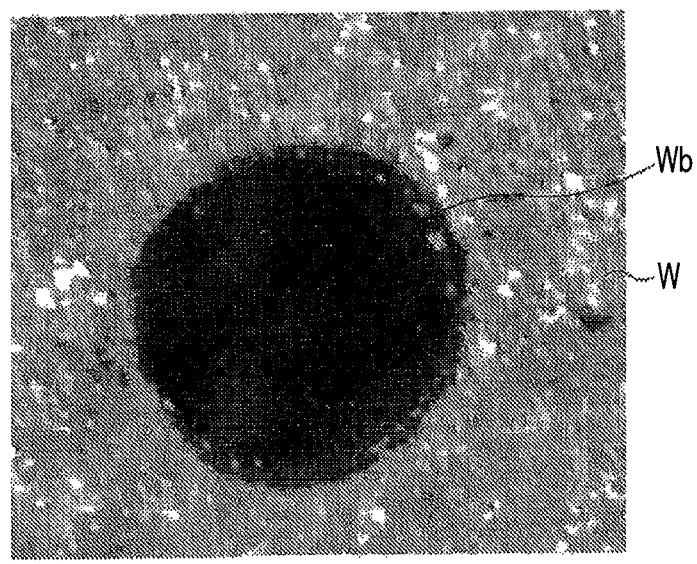
FIG. 31 is a picture when the workpiece in FIG. 30 is seen from an opposite side.

Hereinbelow, a test example when the machining device 10 pierces a hole in the workpiece W is described. FIG. 30 is a picture illustrating an example in which a workpiece is machined by the machining device. FIG. 31 is a picture when the workpiece in FIG. 30 is seen from an opposite side.

In the laser beam L with which the workpiece W was irradiated, a peak laser beam power was set to 100 W to 20 kW, a frequency to 5 Hz to 10 kHz, a pulse width to 1 μs to 100 ms, an irradiation time to 10 ms to 10 s, a focal length to 40 mm to 400 mm, and a rotating speed to 20 rpm to 5000 rpm. Oxygen at a pressure of 0.1 MPa to 1 MPa was used as the assist gas; however, air or nitrogen may be used, or a rare gas such as argon (Ar) or xenon (Xe) may be used. Inconel (trademark) of a thickness of 0.5 mm to 10 mm was used as the workpiece W.

FIGS. 30 and 31 illustrate results which were obtained when the machining device 10 performed machining in the aforementioned conditions. FIG. 30 illustrates a top surface (surface onto which the laser beam was incident) of the workpiece W, and FIG. 31 illustrates a back surface of the workpiece W. In the test example, as illustrated in FIGS. 30 and 31, the hole Wb was formed in the workpiece W. There was an observation that the machining device 10 could reduce a deformation or roughness in the vicinity of the hole Wb, and perform high-precision machining by performing the machining in the aforementioned conditions even if the irradiation time of the laser beam was set to 0.2 s.

As such, in the machining device 10 according to the embodiments, the irradiating head 16 can be divided into the collimating optical system 34, the laser beam rotating unit 35, and the converging optical system 37, and thus it is possible to reduce the size of the irradiating head 16, and to further reduce the size of the machining device 10. The machining device 10 can change the rotating radius R of the laser beam L, with which the workpiece W is irradiated, by changing only the phase angle difference between the first prism 51 and the second prism 52, and thus it is possible to simplify the configuration and to reduce the size of the machining device 10, that is, a laser beam machining device. The machining device 10 changes the rotating radius R of the laser beam L, with which the workpiece W is irradiated, by controlling the phase angle difference between the first prism 51 and the second prism 52, and thus can perform a machining process using the rotating radius R appropriate for the machining mode or the machining conditions. Accordingly, required machining quality can be satisfied, and machining with higher precision can be performed at a high speed.

In the embodiments, a fiber laser beam output device or a short pulsed laser beam output device is used as the machining device 10; however, the machining device 10 of the present invention is not limited to the aforementioned laser beam output devices, and any type of laser beam output device configured to output the laser beam L may be used insofar as the laser beam output can machine the workpiece W. Accordingly, various laser beam output devices can be used as the machining device 10, and a laser beam output device appropriate for the purpose of machining can be used.

The fiber laser beam output device may be a laser beam output device that adopts either one of a continuous wave operation and a pulsed operation. When the continuous wave operation is adopted, it is easy to obtain a high output, and thus the fiber laser beam output device can be suitably used for cutting, welding, or the like. When the pulsed operation is adopted, it is easy to reduce thermal effects, and thus the fiber laser beam output device can be suitably used for fine machining or the like.

In the fiber laser beam output device, an optical intensity distribution in the section of the laser beam L, with which the workpiece W is irradiated, may be a Gaussian mode (single mode) or a multiple mode. When the optical intensity distribution is the Gaussian mode, it is easy to narrow the spot diameter of the irradiation position IP, and to obtain a high output, and thus the fiber laser beam output device can be suitably used for welding, cutting, ultra-fine hole piercing, or the like. When the optical intensity distribution is the multiple mode, it is easy to prevent thermal effect on a base material, and thus the fiber laser beam output device can be suitably used for surface reforming, surface finishing, ultra-fine hole piercing, brazing, or the like.

In the embodiments, the machining device 10 machines the plate-like workpiece W; however, the shape of the workpiece W is not limited to the shape of a plate, and various shapes of workpiece W can be used. The machining device 10 may machine the workpiece W in a machining process that is a combination of cutting, hole piercing, welding, cladding, surface reforming, surface finishing, and laser beam deposition modeling. The machining device can irradiate the workpiece W with the laser beam L along the track TR with a bended shape, or along the track TR with a curved shape by controlling the irradiation position IP of the laser beam L. Accordingly, the machining device 10 can machine the workpiece W in various forms of machining process in which the machining device 10 irradiates the workpiece W with the laser beam L while rotating the laser beam L.

Since the machining device 10 can improve machining precision, a metal material such as a steel sheet is preferably used as the workpiece W; however, the type of workpiece W is not limited to a steel sheet, and the workpiece W may be made of at least any material from the following materials: Inconel (trademark); Hastelloy (trademark); stainless steel; ceramics; steel; carbon steel; silicon; titanium; tungsten; resin; plastics; fiber reinforced plastics; composite materials; and Ni-based heat-resistant alloy. Since the machining device 10 can reduce or remove thermal effects (thermal damage), the machining device 10 can be used to machine various materials or composite materials which are required to be machined with the thermal effects reduced or removed. Accordingly, the machining device 10 can machine various materials.

The machining device 10 may move the workpiece W, the irradiating head 16, or both the workpiece W and the irradiating head 16 so as to move a relative position between the irradiation position IP of the laser beam L and the workpiece W. Accordingly, the machining device 10 can machine the workpiece W at a higher speed.

In the embodiments, the machining device 10 changes the rotating radius R of the laser beam while rotating the laser beam L on the workpiece W; however, when changing the rotating radius R of the irradiation laser beam L, the machining device 10 may control the rotational speed of the first prism 51 and the second prism 52 so that the movement speed (for example, linear speed on the imaginary circle IC) of the irradiation position IP of the rotating laser beam is constant. Accordingly, the machining device can set energy per unit time to be constant at the irradiation position IP of the laser beam L with which the workpiece W is irradiated.

The machining device 10 captures an image of a pilot hole pierced in the workpiece W using the imaging device 40, measures a hole diameter based on data of the captured image of the pilot hole, estimates the thickness TH of the heat-affected layer Wa based on the measured hole diameter and conditions (peak output, pulse width, rotating speed, the rotating radius R, and the like) for the irradiation laser beam L, determines the rotating speed and rotating radius R of the laser beam L based on the estimated thickness TH of the heat-affected layer Wa so as to obtain the allowable thickness range of the heat-affected layer Wa, and controls the rotational speed of the first hollow shaft motor 59 and the second hollow shaft motor 61, and a phase angle difference therebetween using the controller based on the determined rotating speed and rotating radius R of the laser beam L. As a result of a series of these operations, the machining device 10 may pierce a desirable hole in the workpiece W. Accordingly, the machining device 10 can more accurately control the rotational speed and the phase angle difference so that the thickness TH of the heat-affected layer Wa of the workpiece W is within the allowable thickness range.

The machining device 10 adjusts the index angle of the nozzle 38 using the index mechanism 39, and irradiates the workpiece W with the laser beam L in a direction perpendicular to the top surface of the workpiece W. Therefore, the machining device 10 can correct the tapered hole Wd such that the tapered hole Wd becomes a straight hole.

The machining device 10 may cool the collimating optical system 34, the reflective optical system 36, or the like using a cooling mechanism such as a cooling jacket. Accordingly, the machining device 10 can prevent the laser beam L from causing an increase in the temperature of the lens, the mirror, or the like, and thus can stabilize the optical characteristics of the irradiating head 16 and can very precisely control the irradiation position IP of the laser beam L.

In the machining device 10 of the embodiments, the gap detector 41 is disposed to face (disposed right behind) the concentration lens of the converging optical system 37; however, the gap detector 41 may be disposed at another position in the irradiating head 16 insofar as the gap detector 41 can detect the gap between the focal point of the laser beam L and the workpiece W. Accordingly, it is possible to change the attachment position of the gap detector 41 depending on the shape of the machining device 10.

In the machining device 10 of the embodiments, the tilt angle of the incident surface 51a of the first prism 51 is set to an angle less than 1°, and the tilt angle of the emitting surface 52b of the second prism 52 is set to an angle less than 1°; however, the tilt angle of the incident surface 51a and the emitting surface 52b may be set in such a manner that the laser beam reflected by the incident surface 51a of the first prism 51 and the laser beam reflected by the emitting surface 52b of the second prism 52 do not reach the emitting port of the laser beam oscillator 12. Accordingly, in the machining device 10, it is possible to change the tilt angle of the incident surface 51a and the emitting surface 52b depending on the length of the guiding optical system 14. The first prism 51 may be attached to the prism holder 56 so that the tilt angle of the incident surface 51a becomes the aforementioned set angle, and the second prism 52 may be attached to the prism holder 57 so that the tilt angle of the emitting surface 52b becomes the aforementioned set angle.

The first prism 51 may be shaped in such a manner that there is no positional offset between the first prism and the prism holder 56; however, the shape of the first prism 51 is not limited to an octagonal shape, and may be any one of a hexagonal shape to an undecagonal shape, or may be another polygonal shape. Similarly, the second prism 52 may have a polygonal outline in which there is no positional offset between the second prism 52 and the prism holder 57. Accordingly, it is possible to prevent the occurrence of a positional offset between the first prism 51 and the prism holder 56, and prevent the occurrence of a positional offset between the second prism and the prism holder 57. Therefore, the machining device 10 can very precisely control the phase angle difference between the first prism 51 and the second prism 52.

In the embodiments, the machining device 10 machines the workpiece W having the ceramic layer W1 and the metal layer W2 while changing the conditions in two stages; however, the present invention is not limited to this approach in the embodiments. When the workpiece W has three or more layers, it is possible to machine the workpiece W while changing conditions in three stages, and when the workpiece W has multiple layers, it is possible to machine the workpiece W while changing conditions in multiple stages (multiple-stage machining). The workpiece W can be made of various materials other than the ceramic layer W1 and the metal layer W2. Accordingly, the machining device 10 can machine the workpiece W in multiple stages, and can machine the workpiece W with machining conditions appropriate for the material of the workpiece W.

Since the tail-end cutting optical system cuts the tail-ends Lc of the energy distribution of the laser beam L using an aperture or the housing of the irradiating head 16, the aperture or the housing of the irradiating head 16 is preferably cooled by a cooling mechanism such as a cooling jacket. In the machining device 10, the tail-ends Lc, which forms several percent of the energy of the laser beam L, is cut, and thus the cooling mechanism such as a cooling jacket can sufficiently cool the aperture of the housing of the irradiating head 16. Accordingly, the machining device 10 can be configured in a simple manner such that the quality of the laser beam L, with which the workpiece W is irradiated, is improved.

At least one of the first hollow shaft motor 59 and the second hollow shaft motor 61 may be an ultrasonic motor. Accordingly, the machining device 10 can easily improve a positioning accuracy for the phase angle (rotational position) of the first hollow shaft motor 59 and the second hollow shaft motor 61.

The machining device 10 may increase the rotating speed of the laser beam L with which the workpiece W is irradiated, or may decrease the pulse width of the laser beam L. Accordingly, the machining device 10 can further decrease the thickness TH of the heat-affected layer Wa.

The machining device 10 determines the rotational speed of the first prism 51 and the second prism 52 and the phase angle difference between the first prism 51 and the second prism 52 with reference to a control map (spatter control map) that is configured to determine a correlation between the rotating speed of the laser beam L and the amount of debris flying from the irradiation position IP of the laser beam L on the workpiece W, and the machining device 10 may rotate the first hollow shaft motor 59 and the second hollow shaft motor 61 based on the determined rotational speed and phase angle difference. Accordingly, the machining device 10 can reduce the thickness TH of the heat-affected layer Wa and the amount of debris.

In the embodiments, the guiding optical system 14 is an optical fiber; however, the guiding optical is not limited to an optical fiber, and may guide the laser beam L to the irradiating head 16 via the reflection or concentration of the laser beam L by a combination of mirrors and lenses. Accordingly, the irradiating head 16 can be used in various forms of machining device.

In the embodiments, the X-axis movement mechanism 22 moves the machining stage 20 relative to the irradiating head 16; however, the machining stage 20 may be an X/Y stage, or an X/Y/Z stage. The irradiating head 16 may be moved relative to the machining stage 20 in three X, Y, and Z directions, or the irradiating head 16 may be supported by an arm, and may be moved in the C-axis direction in addition to the three X, Y, and Z directions. Accordingly, the irradiating head 16 can be used in various forms of machining device.

REFERENCE SIGNS LIST

10: machining device
12: laser beam oscillator
14: guiding optical system
16: irradiating head
16a: irradiating head cover
20: machining stage
22: X-axis movement mechanism
24: C-axis rotation mechanism
26: Y-axis movement mechanism
28: Z-axis movement mechanism
30: controller
32: portal bridge
35: laser beam rotating unit
36: reflective optical system
37: converging optical system
38: nozzle
39: index mechanism
40: imaging device
41: gap detector
42: support part
42a: assist gas supply piping
51: first prism
52: second prism
53: first rotation mechanism
54: second rotation mechanism
55, 76: cooling mechanism
56, 57: prism holder
58: first spindle
59: first hollow shaft motor
60: second spindle
61: second hollow shaft motor
62, 63: bearing
64, 66: hollow rotor
65, 67: stator
68: encoder
69: phase mark
70: detection unit
71: first reflective mirror
72: second reflective mirror
73: lens-barrel
74: nozzle mounting portion
75: joint portion
77: transparent component
78: coolant supply source
78a, 78b: coolant pipe
79: assist gas supply source
79a: gas piping
81: index shaft
81a: assist gas supply piping
82: hollow shaft motor
83: index angle detector
84: bearing
85: hollow rotor
86: stator
91: welding wire
92: cladding wire
a, b, c, d, f: arrow
IC: imaginary circle
D, Da: irradiation width
IP, IPa, IPb: irradiation position
L: laser beam
Lc: tail-end
OA: optical axis
P: center
R, Ra, Rb: rotating radius
TH: thickness
TR, TRa, TRb: track
W: workpiece
W1: ceramic layer
W2: metal layer
W3: one workpiece
W4: another workpiece
Wa: heat-affected layer
Wb, Wc: hole
Wb1: pilot hole
Wb2: desirable hole
Wd: tapered hole
We: inclined hole
Wf: welded portion Wg: cladded portion
Wh: surface treated portion
The invention claimed is:

1. A machining device that performs a machining process by irradiating a workpiece with a laser beam, the device comprising:
   an irradiating head configured to irradiate the workpiece with the laser beam, and having a collimating optical system that collimates the laser beam, a laser beam rotating unit that rotates the laser beam relative to the workpiece, and a converging optical system that converges the laser beam rotated by the laser beam rotating unit to a focal point; and
   a controller configured to control the operation of the irradiating head,
   wherein the irradiating head is divided into the collimating optical system, the laser beam rotating unit, and the converging optical system,
   wherein the laser beam rotating unit has a first prism that refracts the laser beam, a second prism that is disposed to face the first prism and refracts the laser beam output from the first prism, a first rotation mechanism that rotates the first prism, and a second rotation mechanism that rotates the second prism, and
   wherein the controller is configured to adjust a difference in rotational speed between the first prism and the second prism and a difference in a phase angle between the first prism and the second prism by controlling the first rotation mechanism and the second rotation mechanism synchronously and relatively in rotation based on a relationship between at least a predetermined thickness allowable to be affected by heat of a heat-affected layer of the workpiece and the rotating speed of the laser beam with which the workpiece is irradiated such that a thickness of the heat affected layer is smaller than the predetermined thickness.

2. The machining device according to claim 1,
   wherein the irradiating head is configured such that the collimating optical system, the laser beam rotating unit, and the converging optical system are integrally connected to each other.

3. The machining device according to claim 1,
   wherein the irradiating head has a reflective optical system configured to offset the optical path of the laser beam in the converging optical system relative to the optical path of the laser beam in the laser beam rotating unit, and an index mechanism configured to adjust the angle of the optical path of the laser beam from the reflective optical system to an index angle for the workpiece.

4. The machining device according to claim 3,
   wherein the index mechanism has an index shaft connected to the reflective optical system, and a hollow shaft motor configured to drive the rotation of the index shaft which is rotatably inserted into the hollow shaft motor.

5. The machining device according to claim 1,
   wherein the irradiating head has a gap detector for detecting the gap between the focal point of the laser beam and the workpiece.

6. The machining device according to claim 5,
   wherein the gap detector has an imaging device for capturing an image of a machined portion of the workpiece.

7. The machining device according to claim 1,
   wherein the irradiating head has a cooling mechanism configured to cool the laser beam rotating unit.

8. The machining device according to claim 1,
   wherein each of the first prism and the second prism has a polygonal outline.

9. The machining device according to claim 1,
   wherein an incident surface of the first prism is tilted relative to the optical axis of the laser beam, and an emitting surface of the second prism is tilted relative to the optical axis of the laser beam.

10. The machining device according to claim 1,
    wherein the irradiating head has an assist gas supply piping therein.

11. The machining device according to claim 1,
    wherein the irradiating head has a tail-end cutting optical system that cuts the tail-ends of the energy distribution of the laser beam with which the workpiece is irradiated.

12. The machining device according to claim 1, wherein the machining process includes at least one of cutting, hole piercing, welding, cladding, surface reforming, surface finishing, and laser beam deposition modeling.

13. The machining device according to claim 1,
    wherein the controller adjusts the difference in the rotational speed between the first prism and the second prism and the difference in the phase angle between the first prism and the second prism by controlling the first rotation mechanism and the second rotation mechanism based on a relationship between at least the predetermined thickness allowable to be affected by heat of the heat-affected layer of the workpiece, the rotating speed of the laser beam with which the workpiece is irradiated, and the rotating radius of the laser beam.

14. A machining method for performing a machining process by irradiating a workpiece with a laser beam using the machining device according to claim 1, the method comprising:
    an output step of outputting the laser beam;
    a determination step of determining the difference in the rotational speed between the first prism and the second prism and the difference in the phase angle between the first prism and the second prism based on the relationship between at least the predetermined thickness allowable to be affected by heat of the heat-affected layer of the workpiece, and the rotating speed of the laser beam with which the workpiece is irradiated such that the thickness of the heat affected layer is smaller than the predetermined thickness;
    a rotation step of rotating the first rotation mechanism and the second rotation mechanism synchronously and relatively in rotation based on the determined difference in the rotational speed and the determined difference in the phase angle; and an irradiation step of irradiating the workpiece with the laser beam while rotating the laser beam.

15. The machining method according to claim 14,
    wherein a power of the laser beam is modulated at every rotation of the laser beam relative to the workpiece.

16. The machining method according to claim 14,
    wherein the workpiece is machined in multiple stages.

17. The machining method according to claim 14,
    wherein a non-truly circularly shaped hole is pierced in the workpiece.

18. The machining method according to claim 14,
    wherein the roundness of a hole is detected, the difference in the phase angle between the first prism and the second prism so as to make the irradiation laser beam form a true circular shape corresponding to the detected roundness is calculated, the first prism and the second prism are controlled based on the calculated difference in the phase angle, and thus the roundness of the hole pierced in the workpiece is corrected.

19. The machining method according to claim 14, wherein the gap between the focal point of the laser beam and the workpiece is detected, a relative position between the focal point and the workpiece required to pierce a tapered hole or a straight hole is calculated based on the detected gap, the relative position between the focal point and the workpiece is adjusted to the calculated relative position, the workpiece is irradiated with the laser beam, and thus the tapered or the straight hole is pierced in the workpiece.

20. The machining method according to claim 14, wherein the boundary between different materials of the workpiece is irradiated with a non-circularly-shaped laser beam, and thus an inclined hole is pierced in the workpiece.

21. The machining method according to claim 14, wherein in the determination step, the difference in the rotational speed of the first prism and the second prism and the difference in the phase angle between the first prism and the second prism are determined based on a relationship between at least the predetermined thickness allowable to be affected by heat of the heat-affected layer of the workpiece, the rotating speed of the laser beam with which the workpiece is irradiated, and the rotating radius of the laser beam.

* * * * *